United States Patent
Ono

(10) Patent No.: US 11,644,092 B2
(45) Date of Patent: May 9, 2023

(54) DYNAMIC DAMPER

(71) Applicant: TOYOTA JIDOSHA KABUSHIKI KAISHA, Toyota (JP)

(72) Inventor: Tomoyuki Ono, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/451,821

(22) Filed: Oct. 21, 2021

(65) Prior Publication Data

US 2022/0128141 A1    Apr. 28, 2022

(30) Foreign Application Priority Data

Oct. 28, 2020  (JP) .............................. JP2020-180717

(51) Int. Cl.
| | |
|---|---|
| *F16H 57/00* | (2012.01) |
| *F16H 57/04* | (2010.01) |
| *F16F 15/12* | (2006.01) |
| *F16F 15/124* | (2006.01) |

(52) U.S. Cl.
CPC ..... *F16H 57/0006* (2013.01); *F16F 15/1201* (2013.01); *F16F 15/124* (2013.01); *F16H 57/043* (2013.01); *F16F 2224/025* (2013.01); *F16F 2232/08* (2013.01)

(58) Field of Classification Search
CPC .................. F16F 15/1201; F16F 15/124; F16F 2224/025; F16F 2230/0005; F16F 2232/08; F16H 57/0006; F16H 57/043
See application file for complete search history.

(56) References Cited

U.S. PATENT DOCUMENTS

| | | | |
|---|---|---|---|
| 3,075,406 A * | 1/1963 | Butler, Jr. ........... | F16F 15/1442 464/180 |
| 3,307,419 A | 3/1967 | Brickett et al. | |
| 3,343,377 A | 9/1967 | Andre | |
| 4,325,589 A * | 4/1982 | Hirt ..................... | F16H 57/0479 384/375 |

(Continued)

FOREIGN PATENT DOCUMENTS

| | | |
|---|---|---|
| DE | 102016123896 A1 | 6/2017 |
| JP | H0828627 A  * | 2/1996 |
| JP | 3852208 B2 | 11/2006 |

OTHER PUBLICATIONS

Non-Final Office Action, issued from the United States Patent and Trademark Office, to U.S. Appl. No. 17/452,329 dated May 27, 2022, 15 pages.

(Continued)

*Primary Examiner* — Adam D Rogers
(74) *Attorney, Agent, or Firm* — Hunton Andrews Kurth LLP

(57) ABSTRACT

A dynamic damper for suppressing vibration generated by a gear attached to a rotation shaft, the dynamic damper, includes: a mass body that is disposed inside a rotation shaft having a hollow shape and extends along a shaft center of the rotation shaft; and an elastic body that couples the mass body to the rotation shaft. Further, a flow path for lubricating liquid to flow is provided between an inner peripheral surface of the rotation shaft and the mass body, and the flow path is formed by the inner peripheral surface of the rotation shaft at an axial position where the elastic body is disposed.

5 Claims, 16 Drawing Sheets

(56) References Cited

U.S. PATENT DOCUMENTS

| | | | | |
|---|---|---|---|---|
| 5,865,429 | A * | 2/1999 | Gautheron | F16F 1/387 |
| | | | | 267/293 |
| 6,837,345 | B1 * | 1/2005 | Lauble | F16F 15/1442 |
| | | | | 267/141.1 |
| 7,044,276 | B2 * | 5/2006 | Haneishi | F16F 15/10 |
| | | | | 188/379 |
| 8,323,118 | B2 * | 12/2012 | Ikeda | F16F 15/10 |
| | | | | 188/380 |
| 9,702,429 | B2 * | 7/2017 | Mueller | F16F 15/124 |
| 9,889,506 | B2 * | 2/2018 | Nakatani | B24B 41/007 |
| 9,927,064 | B2 * | 3/2018 | Rippelmeyer | F16H 57/043 |
| 2017/0175846 | A1 | 6/2017 | Considine | |
| 2017/0241471 | A1 * | 8/2017 | Murrish | F16C 3/023 |
| 2022/0128142 | A1 * | 4/2022 | Ono | F16H 57/0006 |

OTHER PUBLICATIONS

Final Office Action, United States Patent and Trademark Office, issued to U.S. Appl. No. 17/452,329 dated Sep. 9, 2022, 14 pages.
Notice of Allowance, United States Patent and Trademark Office, issued to U.S. Appl. No. 17/452,329 dated Dec. 29, 2022, 12 pages.

* cited by examiner

ONE SIDE ←—— AXIAL DIRECTION ——→ OTHER SIDE

DYNAMIC DAMPER

CROSS-REFERENCE TO RELATED APPLICATION(S)

The present application claims priority to and incorporates by reference the entire contents of Japanese Patent Application No. 2020-180717 filed in Japan on Oct. 28, 2020.

BACKGROUND

The present disclosure relates to a dynamic damper.

Japanese Patent No. 3852208 discloses that a dynamic damper is disposed inside a hollow counter shaft in order to prevent vibration generated in a power transmission device from transmitting to a case. In the dynamic damper, a mass body extends along a shaft center of the counter shaft, and the mass body is coupled to an inner peripheral portion of the counter shaft via a cylindrical elastic body.

By the way, in a power transmission device, it is necessary to supply lubricating liquid to a lubrication requiring portion to lubricate the lubrication requiring portion. For that reason, the inside of a hollow rotation shaft may be used as a flow path through which lubricating liquid flows. When the lubricating liquid is supplied into the rotation shaft, the lubricating liquid flows along the inner peripheral surface of the rotation shaft by centrifugal force.

SUMMARY

There is a need for providing a dynamic damper in which lubricating liquid can easily flow inside a rotation shaft.

According to an embodiment, A dynamic damper for suppressing vibration generated by a gear attached to a rotation shaft, the dynamic damper, includes: a mass body that is disposed inside a rotation shaft having a hollow shape and extends along a shaft center of the rotation shaft; and an elastic body that couples the mass body to the rotation shaft. Further, a flow path for lubricating liquid to flow is provided between an inner peripheral surface of the rotation shaft and the mass body, and the flow path is formed by the inner peripheral surface of the rotation shaft at an axial position where the elastic body is disposed.

DETAILED DESCRIPTION

In the configuration described in Japanese Patent No. 3852208, the mass body has a cylindrical shape, so that it is conceivable to use internal space formed by an inner peripheral surface of the mass body as a flow path for lubricating liquid. Unfortunately, the inner peripheral surface of the mass body is positioned on a radially inner side of the inner peripheral surface of the rotation shaft. Thus, the centrifugal force acting on the lubricating liquid in the flow path is smaller than that in the case where the lubricating liquid flows along the inner peripheral surface of the rotation shaft, and the fluidity of the lubricating liquid may be lowered.

Hereinafter, a dynamic damper according to an embodiment of the present disclosure will be specifically described with reference to the drawings. Note that the present disclosure is not limited to the embodiments described below.

First Embodiment

Figure 1:
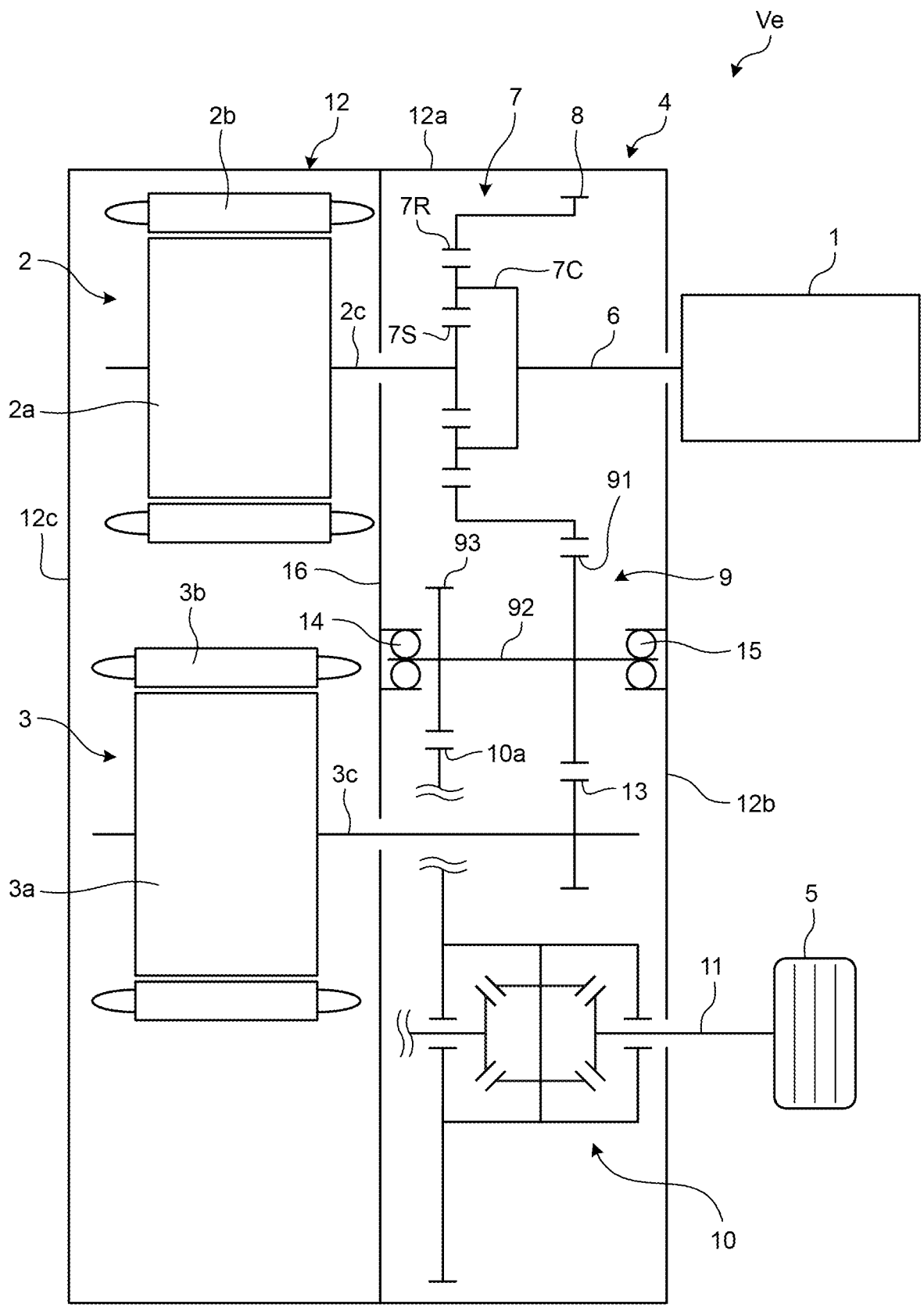
FIG. 1 is a skeleton diagram schematically illustrating a vehicle provided with a dynamic damper according to a first embodiment.

FIG. 1 is a skeleton diagram schematically illustrating a vehicle provided with a dynamic damper according to a first embodiment. As illustrated in FIG. 1, a vehicle Ve is a hybrid vehicle including an engine 1, a first motor 2, and a second motor 3 as power sources. Each of the motors 2 and 3 is a motor generator having a motor function and a power generation function, and is electrically connected to a battery via an inverter. In the vehicle Ve, power output from a power source is transmitted to a wheel 5 via a power transmission device 4.

The power transmission device 4 includes an input shaft 6, a planetary gear mechanism 7, an output gear 8, a counter gear mechanism 9, a differential gear mechanism 10, and a drive shaft 11. Furthermore, the vehicle Ve includes a case 12 that houses a gear mechanism included in the power transmission device 4. The first motor 2, the second motor 3, the planetary gear mechanism 7, the output gear 8, the counter gear mechanism 9, and the differential gear mechanism 10 are housed inside the case 12.

The input shaft 6, the planetary gear mechanism 7, and the first motor 2 are disposed on the same axis as a crankshaft of the engine 1. The first motor 2 is adjacent to the planetary gear mechanism 7, and disposed on the side opposite to the engine 1 in an axial direction. The first motor 2 includes a rotor 2a, a stator 2b, and a rotor shaft 2c. A coil is wound around the stator 2b.

The planetary gear mechanism 7 is a power dividing mechanism, and divides power output from the engine 1 into power on the side of the first motor 2 and power on the side of the wheel 5. At that time, the first motor 2 generates power by the power output from the engine 1. The electric power is stored in the battery, or supplied to the second motor 3 via the inverter.

The planetary gear mechanism 7 is a single-pinion planetary gear mechanism, and includes a sun gear 7S, a carrier 7C, and a ring gear 7R as three rotating elements. The rotor shaft 2c of the first motor 2 is coupled to the sun gear 7S so as to rotate integrally. The input shaft 6 is coupled to the carrier 7C so as to rotate integrally. The engine 1 is coupled to the carrier 7C via the input shaft 6. The output gear 8 is integrated with the ring gear 7R. The output gear 8 outputs torque from the planetary gear mechanism 7 to the side of the wheel 5. The output gear 8 rotates integrally with the ring gear 7R, and meshes with a counter driven gear 91 of the counter gear mechanism 9.

The counter gear mechanism 9 includes the counter driven gear 91, a counter shaft 92, and a counter drive gear 93. The counter shaft 92 is disposed in parallel with the input shaft 6. The counter driven gear 91 and the counter drive gear 93 are attached to the counter shaft 92 so as to rotate integrally. The counter drive gear 93 meshes with a differential ring gear 10a of the differential gear mechanism 10. The wheels 5 are coupled to the differential gear mechanism 10 via the right and left drive shafts 11.

Furthermore, the vehicle Ve can add torque output from the second motor 3 to torque transmitted from the engine 1 to the wheel 5. The second motor 3 includes a rotor 3a, a stator 3b, and a rotor shaft 3c. A coil is wound around the stator 3b.

The rotor shaft 3c is disposed in parallel with the counter shaft 92. A reduction gear 13 is provided on the rotor shaft 3c. The reduction gear 13 meshes with the counter driven gear 91.

The case 12 includes a case member 12a, a front cover 12b, and a rear cover 12c. The case member 12a houses the power transmission device 4. The front cover 12b is a cover member on the side of the engine 1, and is bolted to the case member 12a. The rear cover 12c is a cover member on the side of each of the motors 2 and 3, and is bolted to the case member 12a.

A motor chamber and a gear chamber are partitioned by a center support 16 inside the case 12. The motor chamber houses each of the motors 2 and 3. The gear chamber houses the power transmission device 4 including the gear mechanism. The center support 16 is a partition wall that distinguishes the motor chamber and the gear chamber, and is a fixing portion integrated with the case 12. The center support 16 includes a through hole through which the rotor shaft 2c of the first motor 2 is inserted and a through hole through which the rotor shaft 3c of the second motor 3 is inserted. Each of the rotor shafts 2c and 3c extends to the motor chamber and the gear chamber through each through hole.

The case 12 supports both ends of the counter shaft 92 with a first bearing 14 and a second bearing 15 in the gear chamber. The first bearing 14 is a rolling bearing attached to an end on one side of the counter shaft 92, and has an outer ring attached to the center support 16. The second bearing 15 is a rolling bearing attached to an end on the other side of the counter shaft 92, and has an outer ring attached to the front cover 12b.

Figure 2:
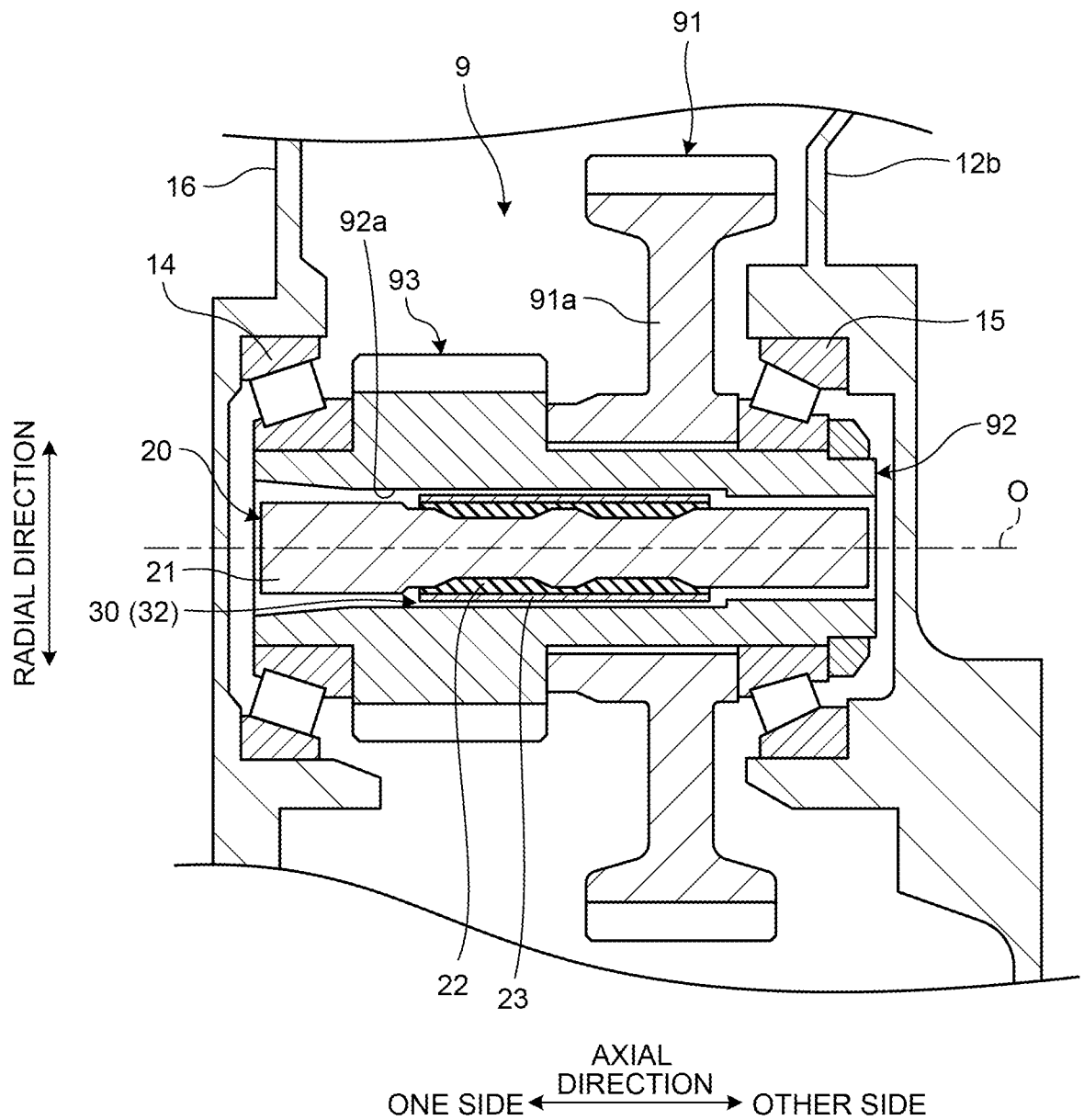
FIG. 2 is a cross-sectional view schematically illustrating a counter gear mechanism.

Furthermore, as illustrated in FIG. 2, the counter driven gear 91 is spline-fitted to the counter shaft 92. The counter driven gear 91 includes a helical gear. That is, the meshing portion between the counter driven gear 91 and the output gear 8 and the meshing portion between the counter driven gear 91 and the reduction gear 13 are meshing portions between helical gears. For that reason, vibration is generated with a load (thrust force) in the axial direction generated by the meshing helical gears, which serves as compelling force, in the counter driven gear 91. Therefore, a dynamic damper 20 (illustrated in FIG. 2 and the like) is provided on the counter shaft 92 in the counter gear mechanism 9 in order to suppress vibration generated at the counter driven gear 91 from transmitting to the case 12 via the first bearing 14 and the second bearing 15. As a result, before the vibration is transmitted from each of the bearings 14 and 15 to the case 12, the vibration transmission is suppressed by damping the vibration at the counter shaft 92, and radiation sound from the case 12 is reduced.

Furthermore, lubricating liquid is supplied to a lubrication requiring portion of the power transmission device 4 inside the case 12. For example, the lubricating liquid scraped up by the differential ring gear 10a is supplied to the lubrication requiring portion. Oil can be used as the lubricating liquid. The lubrication requiring portion is not limited to the gear, and includes a bearing. For that reason, the lubricating liquid is also supplied to the first bearing 14 and the second bearing 15 by scraping lubrication. The first bearing 14 and the second bearing 15 are attached to both ends of the counter shaft 92. Therefore, the lubricating liquid can flow in the axial direction inside the counter shaft 92 in the counter gear mechanism 9. As a result, the lubricating liquid having lubricated one bearing can be supplied to the other bearing through the inside of the counter shaft 92 in the first bearing 14 and the second bearing 15.

Damper

Figure 3:
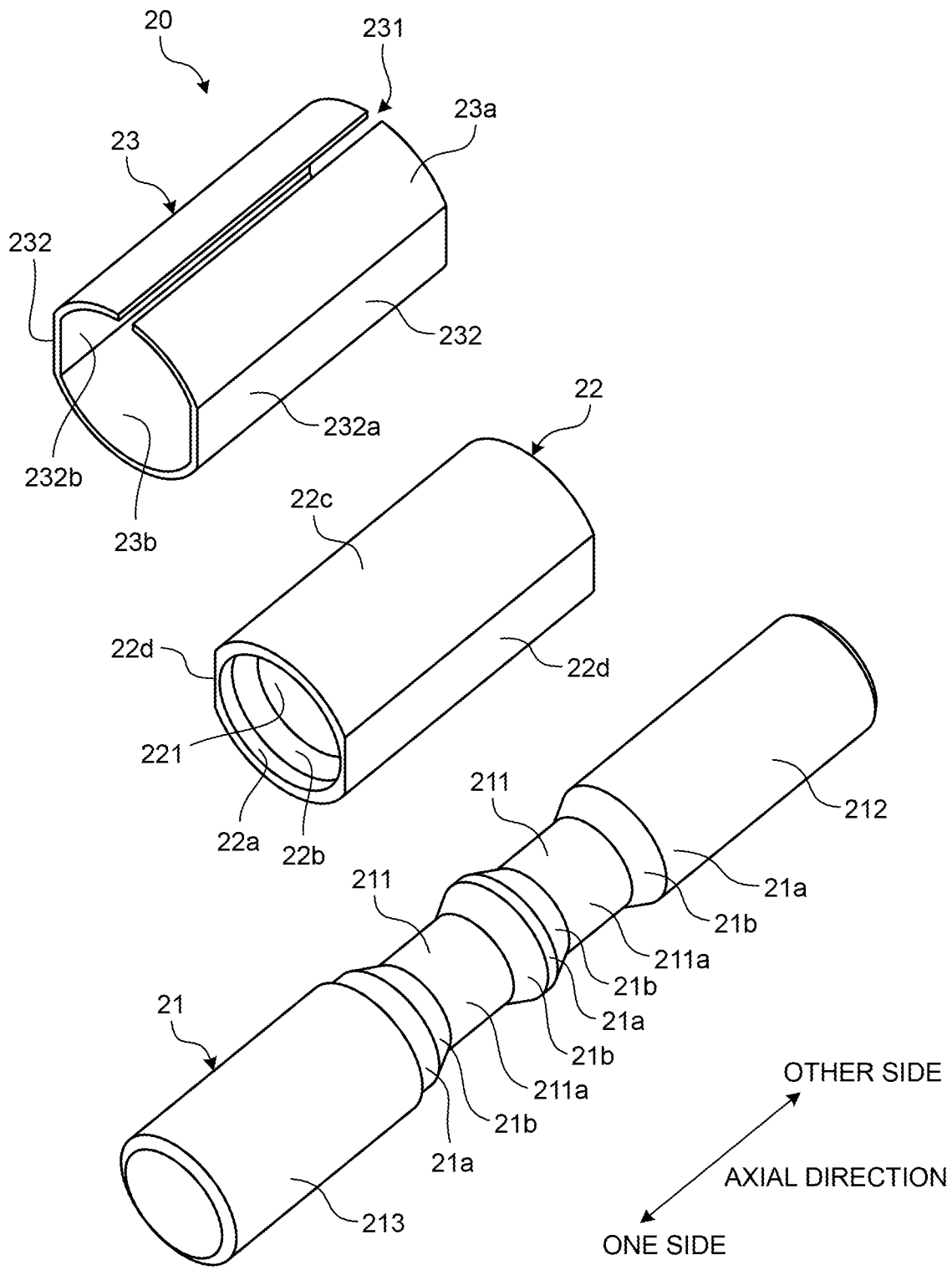
FIG. 3 is an exploded view for illustrating the dynamic damper according to the first embodiment.

As illustrated in FIG. 2, the dynamic damper 20 is disposed inside the hollow counter shaft 92. As illustrated in FIG. 3, the dynamic damper 20 includes a mass body 21, a rubber 22, and a holder 23.

The mass body 21 is a rod-shaped inertial mass body that vibrates in response to vibration of the counter shaft 92. The mass body 21 extends along a shaft center O of the counter shaft 92, and is coupled to the inside of the counter shaft 92 via the rubber 22. Then, the mass body 21 vibrates in response to the vibration of the counter shaft 92 while being held by the rubber 22.

The rubber 22 is a tubular member in contact with the mass body 21. The dynamic damper 20 uses a polymer material for a spring, and includes the rubber 22 as an elastic body. Then, vibration of the mass body 21 in response to the vibration of the counter driven gear 91 causes compressive stress to act on the rubber 22.

Figure 4:
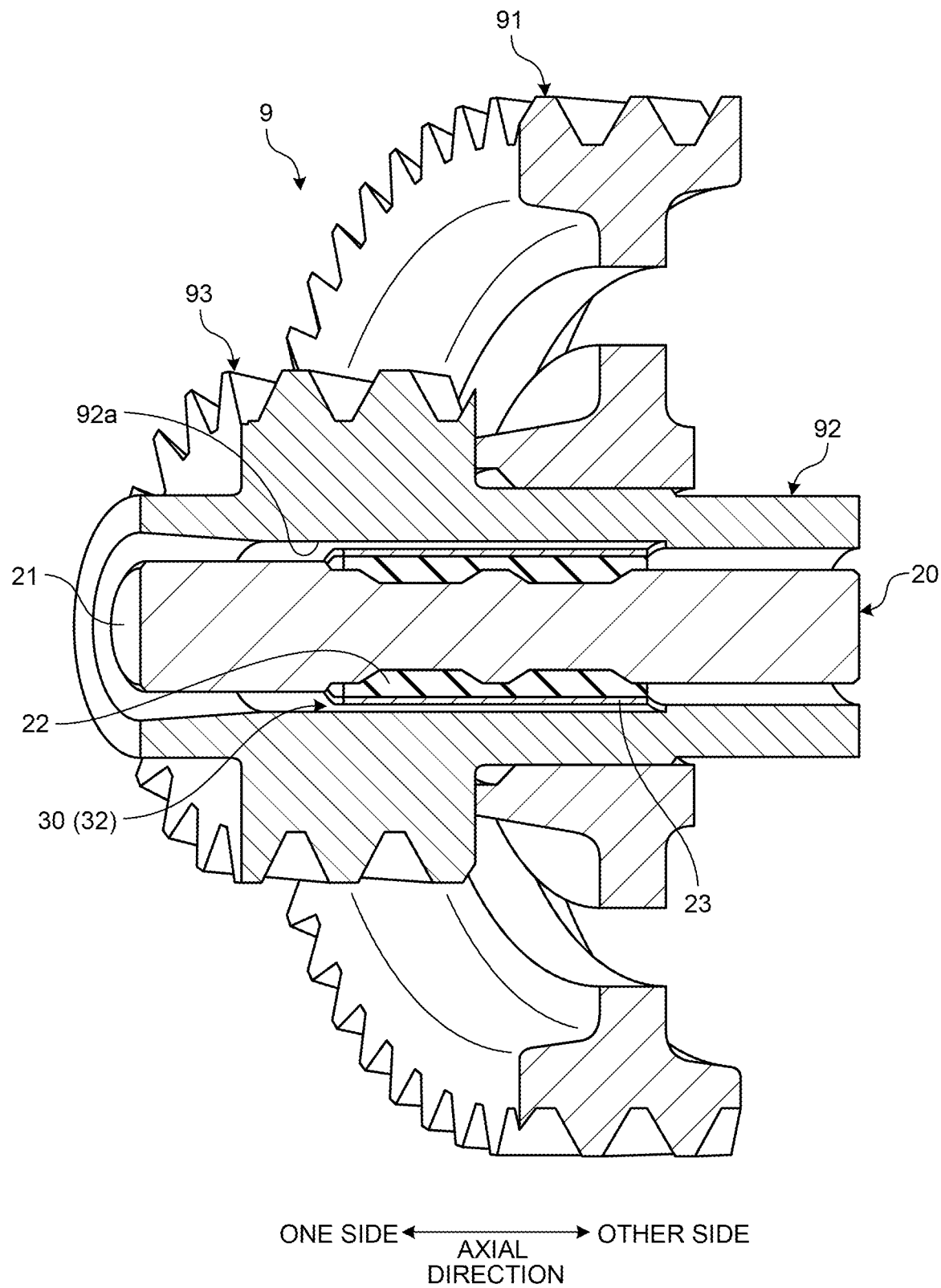
FIG. 4 is a partial cross-sectional view for illustrating the dynamic damper according to the first embodiment.
Figure 5:
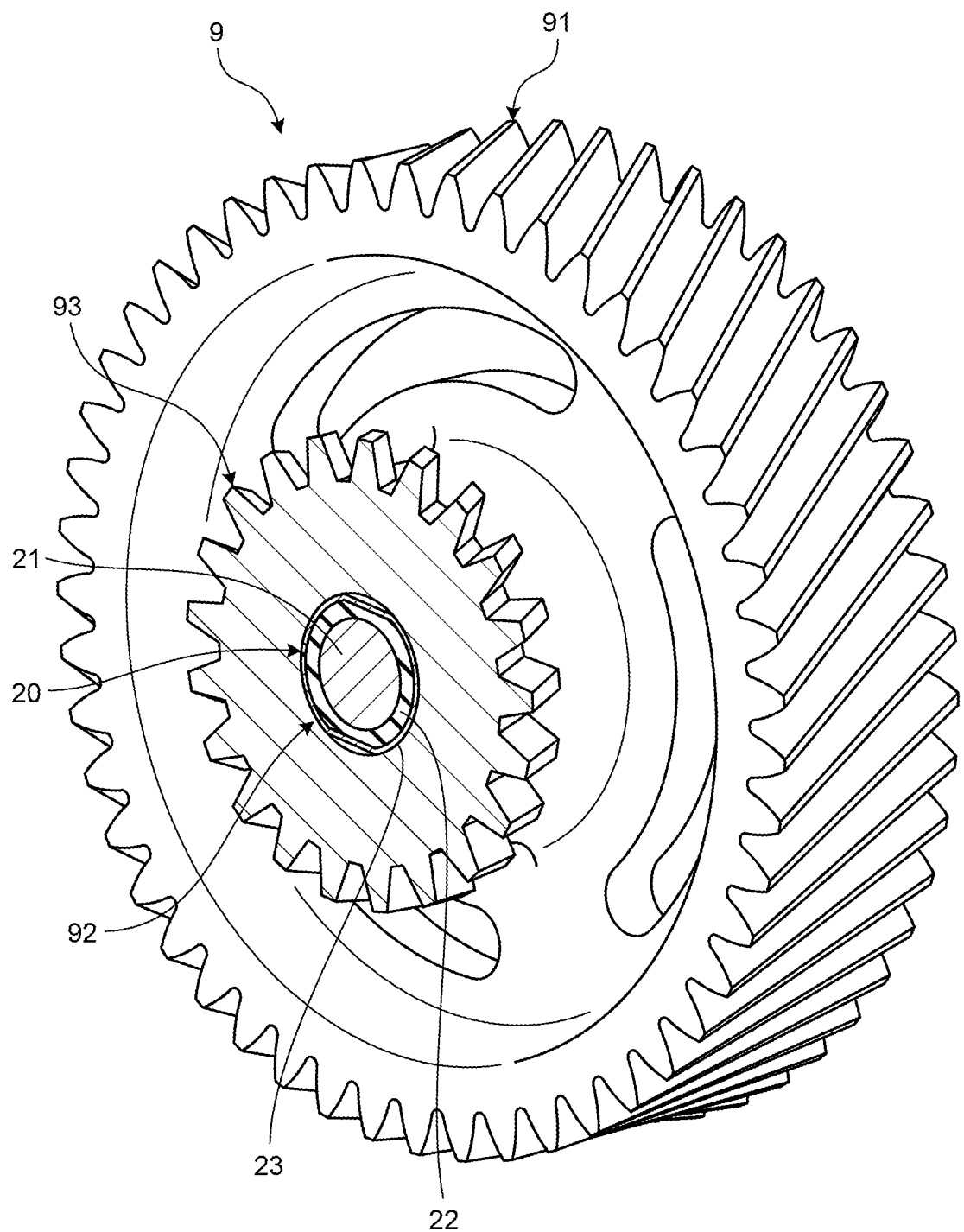
FIG. 5 is a partial cross-sectional view for illustrating the dynamic damper according to the first embodiment.

The holder 23 is a tubular member that integrally holds the mass body 21 and the rubber 22. The holder 23 is attached to the inside of the counter shaft 92. For example, the rubber 22 is attached to the outer peripheral portion of the mass body 21 from the state before assembly illustrated in FIG. 3. Then, the rubber 22 and the mass body 21, which are integrated, are inserted into the holder 23 from the axial direction. In the state after assembly illustrated in FIGS. 4 and 5, the holder 23 is inserted into the counter shaft 92 from one side in the axial direction, and the holder 23 is press-fitted into the counter shaft 92. The holder 23 contracts at the time of assembly and expands inside the counter shaft 92 to be held on an inner peripheral surface 92a of the counter shaft 92. Note that, in the description, the axial direction of the counter shaft 92 is simply referred to as an axial direction, and the radial direction of the counter shaft 92 is simply referred to as a radial direction.

Furthermore, the holder 23 includes a slit portion 231 and a flat portion 232. Both the slit portion 231 and the flat portion 232 form a flow path 30 for the lubricating liquid to flow inside the counter shaft 92.

The slit portion 231 extends along the axial direction, and is provided over the entire axial area of the holder 23. The slit portion 231 is formed to have a constant width. Furthermore, one slit portion 231 is provided in a portion of the holder 23, where the outer peripheral surface and the inner peripheral surface are formed in an arc surface. For that reason, when the holder 23 is viewed from the axial direction, the holder 23 is formed in a substantially C shape. The slit portion 231 functions as an opening for contraction and expansion at the time of assembly of the holder 23.

Figure 6:
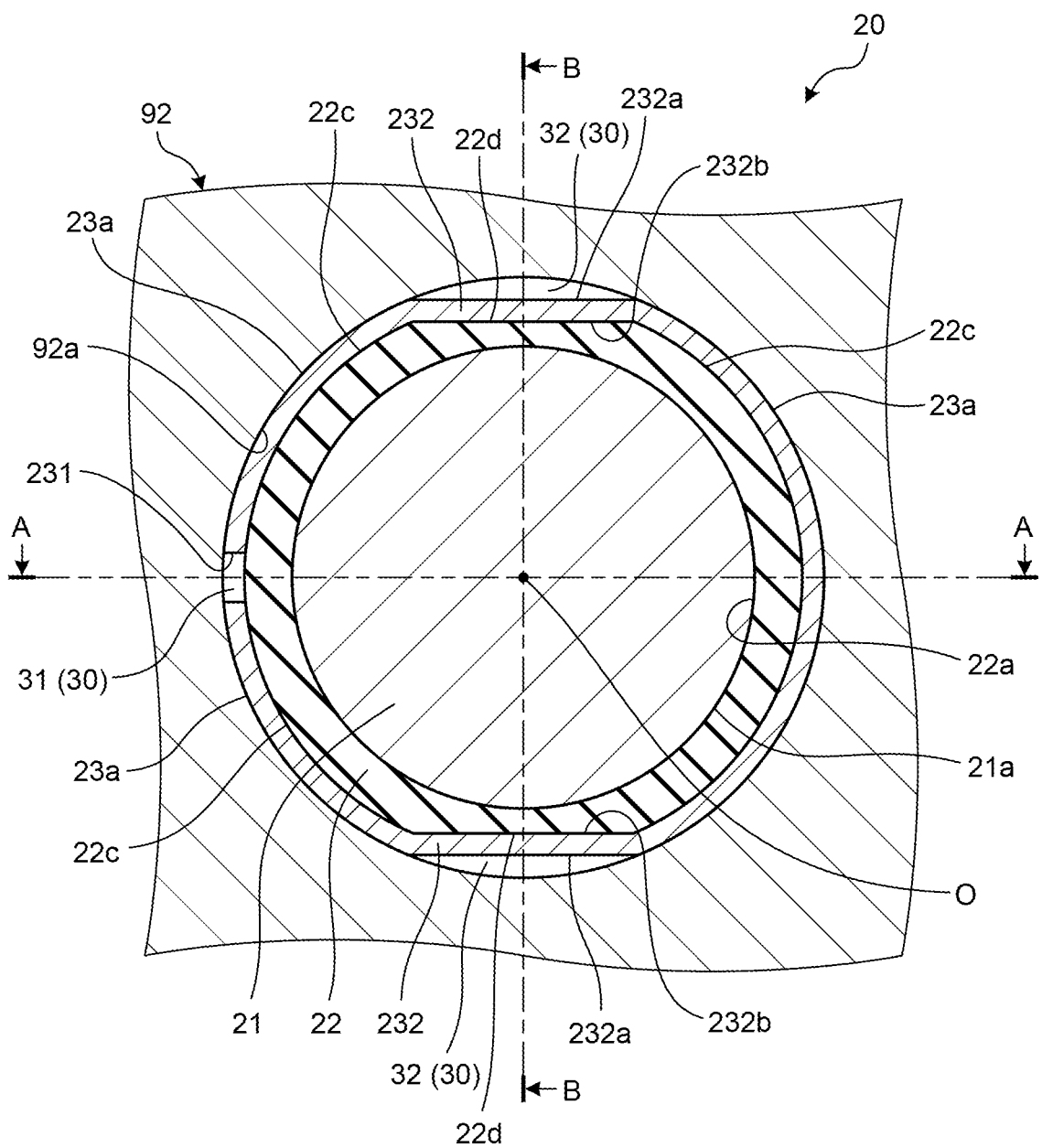
FIG. 6 is a cross-sectional view schematically illustrating the dynamic damper according to the first embodiment.

The flat portion 232 is a portion of the holder 23, where the outer peripheral surface and the inner peripheral surface are formed in a flat surface. The flat portion 232 extends along the axial direction, and is provided over the entire axial area of the holder 23. Furthermore, as illustrated in FIG. 6, two flat portions 232 are provided at positions symmetrical with respect to the shaft center O. The two flat portions 232 are provided at positions of 90 degrees from the slit portion 231 in the circumferential direction. As described above, the holder 23 includes one slit portion 231 and two flat portions 232.

Then, when the holder 23 is press-fitted into the counter shaft 92, the flat portion 232 is a non-contact portion that is not in contact with the inner peripheral surface 92a of the counter shaft 92 as illustrated in FIG. 6. The holder 23 includes a first outer peripheral surface 23a and an outer peripheral surface 232a of the flat portion 232. The first outer peripheral surface 23a is in contact with the inner peripheral surface 92a of the counter shaft 92. The outer peripheral surface 232a serves as a second outer peripheral surface that is not in contact with the inner peripheral surface 92a of the counter shaft 92. The first outer peripheral surface 23a is a contact surface formed in an arc surface. The outer peripheral surface 232a of the flat portion 232 is a non-contact surface formed in a flat surface.

Moreover, the holder 23 is disposed between the inner peripheral surface 92a of the counter shaft 92 and the rubber 22 in the radial direction. For that reason, a first flow path 31 formed by the slit portion 231 and the inner peripheral surface 92a of the counter shaft 92 is provided between the inner peripheral surface 92a of the counter shaft 92 and the rubber 22 inside the counter shaft 92.

In addition, a second flow path 32 formed by the outer peripheral surface 232a of the flat portion 232 and the inner peripheral surface 92a of the counter shaft 92 is provided between the inner peripheral surface 92a of the counter shaft 92 and the flat portion 232 of the holder 23 inside the counter shaft 92.

Figure 7:
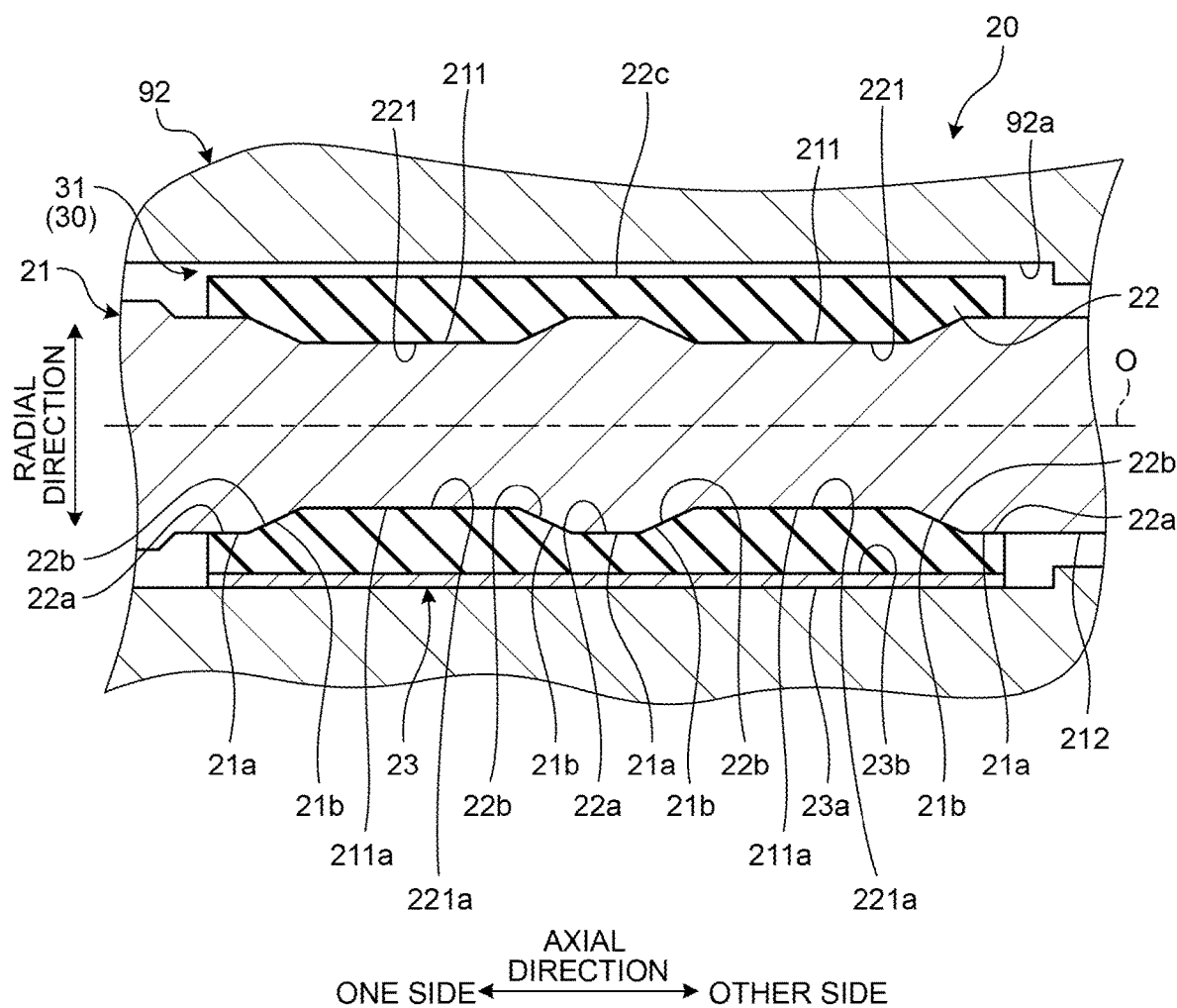
FIG. 7 is a cross-sectional view illustrating a cross section taken along line A-A in FIG. 6.

Lubricating liquid flows through the first flow path 31. As illustrated in FIG. 6, the first flow path 31 is constituted by space surrounded by the inner peripheral surface 92a of the counter shaft 92, the slit portion 231, and a first outer peripheral surface 22c of the rubber 22. That is, the first flow path 31 is constituted by a gap formed by the inner peripheral surface 92a of the counter shaft 92 and the rubber 22 facing each other in the radial direction. Moreover, as illustrated in FIG. 7, the first flow path 31 extends in the axial direction along the inner peripheral surface 92a of the counter shaft 92 at an axial position where the rubber 22 is provided. That is, the first flow path 31 extends in the axial direction at a position radially outside the rubber 22 so as to communicate with openings opened on both axial end sides of the holder 23. Then, film-like lubricating liquid can flow on the inner peripheral surface 92a of the counter shaft 92 by centrifugal force inside the first flow path 31.

Figure 8:
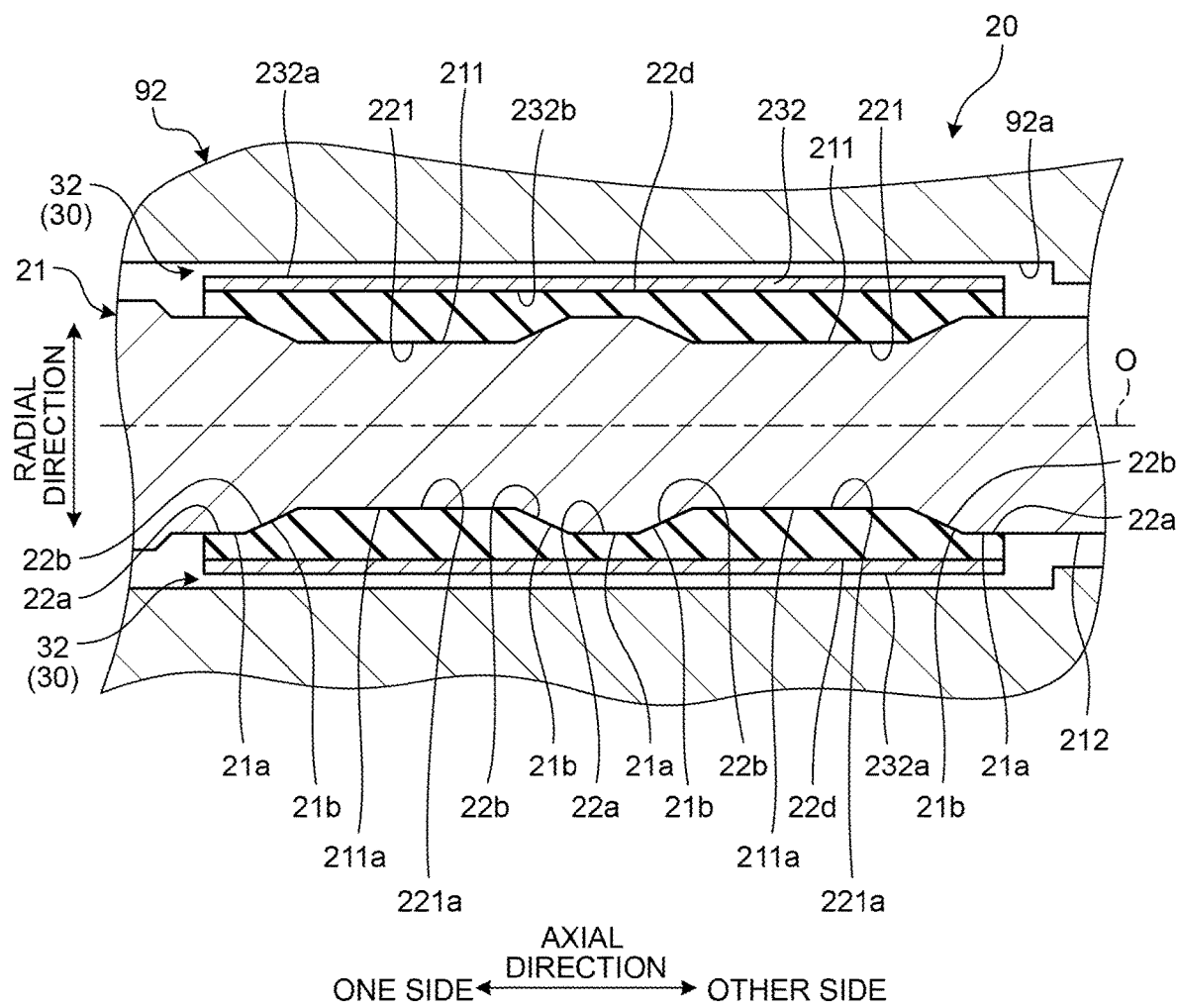
FIG. 8 is a cross-sectional view illustrating a cross section taken along line B-B in FIG. 6.

Lubricating liquid flows through the second flow path 32. As illustrated in FIG. 6, the second flow path 32 is constituted by space surrounded by the inner peripheral surface 92a of the counter shaft 92 and the outer peripheral surface 232a of the flat portion 232. That is, the second flow path 32 is constituted by a gap formed by the inner peripheral surface 92a of the counter shaft 92 and the flat portion 232 facing each other in the radial direction. Moreover, as illustrated in FIG. 8, the second flow path 32 extends in the axial direction along the inner peripheral surface 92a of the counter shaft 92 at an axial position where the rubber 22 is provided. That is, the second flow path 32 extends in the axial direction at a position radially outside the flat portion 232 so as to communicate with openings opened on both axial end sides of the holder 23. Then, film-like lubricating liquid can flow on the inner peripheral surface 92a of the counter shaft 92 by centrifugal force inside the second flow path 32.

Figure 9:
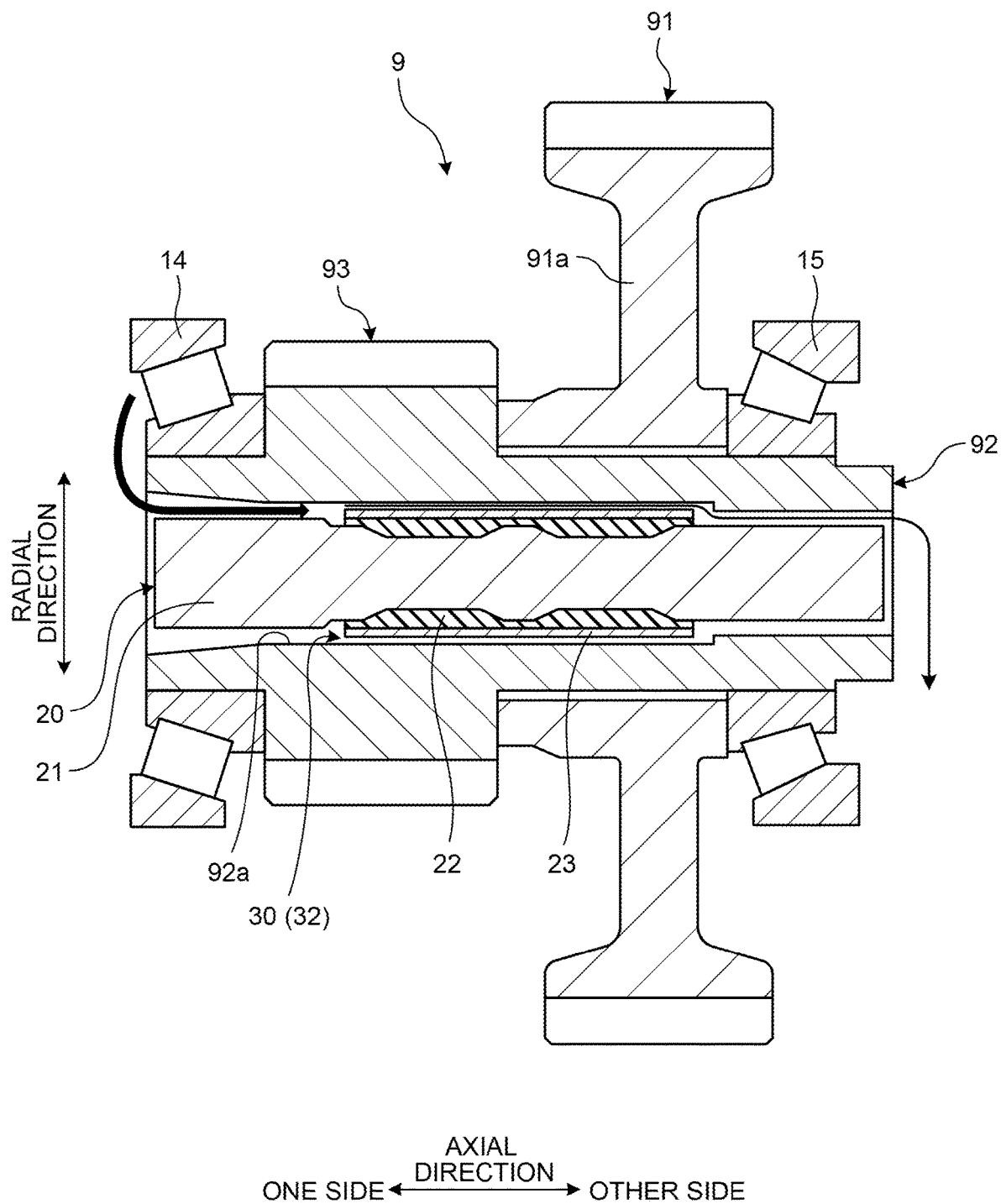
FIG. 9 is a schematic view for illustrating flow of lubricating liquid.

Furthermore, as illustrated in FIG. 6, two second flow paths 32 are provided at positions symmetrical with respect to the shaft center O. The two second flow paths 32 are provided at positions of 90 degrees from the first flow path 31 in the circumferential direction. As described above, in the first embodiment, one first flow path 31 and two second flow paths 32 are provided as the flow paths 30 for the lubricating liquid to flow. As a result, in the counter gear mechanism 9, as illustrated in FIG. 9, the lubricating liquid having lubricated the first bearing 14 can flow through the flow path 30 inside the counter shaft 92 to be supplied to the second bearing 15.

Furthermore, the holder 23 is formed to have the same thickness as a whole. In contrast, the rubber 22 is formed to have a partially different thickness. As illustrated in FIG. 6, the rubber 22 has an inner peripheral surface entirely formed in an arc shape, while having an outer peripheral surface partially formed in a flat shape. Then, in the rubber 22, a portion where a first contact surface 22a is provided is thinner than a portion where a second contact surface 22b is provided. The rubber 22 has different thicknesses in axial positions. For that reason, when comparison is performed at the same axial position, the portion where the second contact surface 22b is provided is thinner than the portion where the first outer peripheral surface 22c is provided in the rubber 22.

Moreover, as illustrated in FIG. 3, the dynamic damper 20 is configured such that a recess 211 is provided on an outer peripheral portion of the mass body 21 and compressive stress acts on the rubber 22 at the time when the mass body 21 vibrates in the axial direction. The rubber 22 includes a protrusion 221 whose inner peripheral portion protrudes radially inward. Then, the recess 211 of the mass body 21 is in contact with the protrusion 221 of the rubber 22. That is, the recess 211 of the mass body 21 and the protrusion 221 of the rubber 22 are provided at positions corresponding to each other.

Furthermore, the mass body 21 includes two recesses 211 arranged side by side in the axial direction. That is, the rubber 22 includes two protrusions 221 arranged side by side in the axial direction. Moreover, the mass body 21 includes non-contact portions 212 and 213, which is not in contact with the rubber 22, on both axial end sides. The non-contact portion 212 is provided on the other side in the axial direction, and the non-contact portion 213 is provided on one side in the axial direction.

Since the rubber 22 is formed in a tubular shape, the inner peripheral surface thereof is in contact with the mass body 21, and the outer peripheral surface thereof is in contact with the holder 23. The inner peripheral surface of the rubber 22 includes the first contact surface 22a and the second contact surface 22b as contact surfaces with the mass body 21. The first contact surface 22a is parallel to the axial direction. The second contact surface 22b is not parallel to the axial direction. The outer peripheral surface of the rubber 22 includes the arc-shaped first outer peripheral surface 22c and a flat second outer peripheral surface 22d. The first outer peripheral surface 22c includes a third contact surface and an outer peripheral surface. The third contact surface is in contact with a portion other than the flat portion 232 of the holder 23. The outer peripheral surface is exposed to the slit portion 231. The second outer peripheral surface 22d is a fourth contact surface in contact with the flat portion 232 of the holder 23.

As illustrated in FIGS. 7 and 8, the mass body 21 includes a first contact portion 21a and a second contact portion 21b as contact portions in contact with the rubber 22. The first contact portion 21a is in contact with the first contact surface 22a. The second contact portion 21b is in contact with the second contact surface 22b.

The first contact portion 21a is formed in a shape of a column having the same diameter as the non-contact portion 212. The second contact portion 21b is included in the recess 211 recessed radially inward from the first contact portion 21a. That is, the recess 211 includes the second contact portion 21b and a bottom surface 211a. The second contact portion 21b is inclined to the axial direction. The bottom surface 211a is parallel to the axial direction.

The bottom surface 211a is an outer peripheral surface having a smaller diameter than the outer diameter of the first contact portion 21a, and is in contact with an inner peripheral surface 221a of the protrusion 221 of the rubber 22. A pair of second contact portions 21b whose inclination directions are reversed is provided on both axial sides of the bottom surface 211a. That is, one recess 211 includes the second contact portion 21b as one inclined surface provided on one axial side and the second contact portion 21b as the other inclined surface provided on the other axial side. As a result, when the mass body 21 moves back and forth along the axial direction, the inclined surface formed by the second contact portion 21b can push the rubber 22, and cause compressive stress to act on the rubber 22.

Furthermore, the second contact portion 21b is an inclined surface inclined to the radial direction, that is, a tapered surface. The inclination angle of the second contact portion 21b is set to be larger than 0 degrees and smaller than 90 degrees. The second contact portion 21b set to the inclination angle can increase the contact surface with the rubber 22, and raise the axial elastic modulus of the rubber 22, that is, the elastic modulus in a compression direction at the time of axial vibration. In short, increasing the area of the inclined surface of the second contact portion 21b projected on a flat surface along the radial direction can raise the elastic modulus in the compression direction at the time of axial vibration.

The inner peripheral surface of the holder 23 includes an arc-shaped first inner peripheral surface 23b and an inner peripheral surface 232b of the flat portion 232 as contact surfaces in contact with the rubber 22. The first inner peripheral surface 23b is in contact with the first outer peripheral surface 22c. The inner peripheral surface 232b is in contact with the second outer peripheral surface 22d. The first inner peripheral surface 23b is an inner peripheral surface of a portion where the first outer peripheral surface 23a is formed. The inner peripheral surface 232b is a flat surface that forms the second outer peripheral surface of the holder 23.

For example, in the dynamic damper 20, the rubber 22 is joined to the mass body 21, and the rubber 22 is joined to the holder 23. As a result, when the mass body 21 vibrates, the mass body 21 can be reliably held by the holder 23.

Resonance Mode of Counter Driven Gear

A resonance mode of the counter driven gear 91 will be described. Falling resonance and axial resonance are generated with thrust force generated by the meshing helical gears, which serves as compelling force, in the counter driven gear 91.

The falling resonance is a vibration mode (falling resonance mode) in which the counter driven gear 91 of a large-diameter gear vibrates so as to fall to the axial direction side. In other words, the axial resonance is a vibration mode (axial resonance mode) in which the counter driven gear 91 vibrates in the axial direction.

As described above, the counter driven gear 91 has two resonance frequencies of the resonance frequency of the falling resonance mode and the resonance frequency of the axial resonance mode. That is, when the counter shaft 92 that rotates integrally with the counter driven gear 91 is to be damped, there are two target resonance frequencies.

Moreover, the resonance frequency of the falling resonance mode is lower than the resonance frequency of the axial resonance mode in the counter driven gear 91. Specifically, the resonance frequency of the falling resonance mode is approximately 2.6 kHz, and the resonance frequency of the axial resonance mode is approximately 3.6 kHz. This is because, since the counter driven gear 91 is a large-diameter gear, the bending primary mode of a spoke portion 91a is set at the time of falling resonance, whereas a secondary mode is set at the time of axial resonance.

Therefore, in the embodiment, the resonance frequency of the dynamic damper 20 is matched with the resonance frequency of a target, and the resonance mode of the dynamic damper 20 is set to cancel the resonance mode of the target, so that the damping effect corresponding to both the resonance modes is exhibited. That is, the resonance frequency of the dynamic damper 20 is matched with the resonance frequency of the falling resonance mode and the resonance frequency of the axial resonance mode.

Resonance Mode of Dynamic Damper

The dynamic damper 20 can vibrate in a damper inclination mode and a damper front-rear mode. The damper inclination mode is a resonance mode of a dynamic damper corresponding to the falling resonance mode. The damper front-rear mode is a resonance mode of a dynamic damper corresponding to the axial resonance mode.

The damper inclination mode is a resonance mode in which the mass body 21 vibrates so as to take a posture inclined to the shaft center O. That is, the mass body 21 swings to the shaft center O in the damper inclination mode. In contrast, the damper front-rear mode is a resonance mode in which the mass body 21 moves forward and backward in the axial direction along the shaft center O. That is, the mass body 21 reciprocates along the axial direction in the damper front-rear mode.

Then, when the counter driven gear 91 generates the falling resonance, the dynamic damper 20 is in the damper inclination mode, and the mass body 21 is in a swing state. As described above, resonance of the dynamic damper 20 in an inclination direction (direction inclined to shaft center O) cancels transmission of vibration of the falling resonance of the counter driven gear 91.

Furthermore, when the counter driven gear 91 generates axial resonance, the dynamic damper 20 is in the damper front-rear mode, and the mass body 21 is in a linear motion state. As described above, resonance of the dynamic damper 20 in the axial direction cancels transmission of vibration of the axial resonance of the counter driven gear 91.

When the dynamic damper 20 is in the damper inclination mode, swinging of the mass body 21 vibrates the first contact portion 21a such that the first contact portion 21a pushes the first contact surface 22a of the rubber 22, and causes compressive stress to act on the rubber 22. When the dynamic damper 20 is in the damper front-rear mode, linear motion of the mass body 21 vibrates the second contact portion 21b such that the second contact portion 21b pushes the second contact surface 22b of the rubber 22, and causes compressive stress to act on the rubber 22.

Resonance Frequency of Dynamic Damper

A resonance frequency f of a dynamic damper is expressed by the following expression (1) by using a spring constant k and a mass m.

$$f=(1/2\pi)\sqrt{k/m} \qquad (1)$$

The rubber 22 made of polymer material is provided as a spring of a dynamic damper in the dynamic damper 20. For that reason, the resonance frequency of the dynamic damper 20 can be expressed by using the elastic modulus of the rubber 22 instead of the spring constant k in the above expression (1).

The elastic modulus of the rubber 22 includes an elastic modulus E in the compression direction and an elastic modulus G in a shearing direction. Then, the relation between the elastic modulus E in the compression direction and the elastic modulus G in the shearing direction is expressed by the following expression (2) by using the Poisson ratio ν of the rubber 22.

$$G=E/[2(1+\nu)] \qquad (2)$$

In the above expression (2), the Poisson ratio ν of the rubber 22 is approximately 0.5. For that reason, the elastic modulus G in the shearing direction is smaller than the elastic modulus E in the compression direction.

Then, when the mass m is constant in the dynamic damper, the resonance frequency f is determined based on the spring constant k. That is, in the dynamic damper 20, the mass of the mass body 21 is constant, so that the resonance frequency is determined based on the elastic modulus of the rubber 22.

Here, as a comparative example, a dynamic damper including a cylindrical mass body and a cylindrical rubber as in a related-art structure disclosed in Japanese Patent No. 3852208 will be described. In the comparative example, the contact surface between the rubber and the mass body includes only a surface parallel to the axial direction, so that no compressive force acts on the rubber and only shearing force acts at the time of axial resonance of the counter driven gear. For that reason, the resonance frequency f is determined by the elastic modulus G in the shearing direction when the mass body vibrates in the axial direction in response to the axial resonance (damper front-rear mode) in the dynamic damper of the comparative example. In contrast, compressive force acts on the rubber at the time of falling resonance of the counter driven gear in the comparative example.

That is, the resonance frequency in the case where only the shearing force acts on the rubber (damper front-rear mode) is lower than the resonance frequency in the case where the compressive force acts on the rubber (damper inclination mode) in the dynamic damper of the comparative example. Specifically, as a result of CAE analysis, the resonance frequency in the damper front-rear mode is approximately 1.6 kHz, and the resonance frequency in the damper inclination mode is approximately 2.6 kHz in the comparative example.

In contrast, the resonance frequency in the axial resonance mode is higher than the resonance frequency in the falling resonance mode in the counter driven gear 91 to be damped. Specifically, the resonance frequency of the counter driven gear 91 is approximately 3.6 kHz in the axial resonance mode and approximately 2.6 kHz in the falling resonance mode. That is, the magnitude relation between the resonance frequencies is opposite to that of an object to be damped in the dynamic damper of the comparative example. Thus, the dynamic damper of the comparative example cannot address both of the two resonance modes in the object to be damped.

Therefore, the dynamic damper 20 can exert a damping effect corresponding to both of the two resonance modes of the counter driven gear 91. The dynamic damper 20 is configured such that the resonance frequency in the damper front-rear mode corresponding to the axial resonance mode is higher than the resonance frequency in the damper inclination mode corresponding to the falling resonance mode.

As described above, according to the first embodiment, lubricating liquid flows in the axial direction through the flow path 30 inside the counter shaft 92. The flow path 30 formed by the inner peripheral surface 92a of the counter shaft 92 increases the centrifugal force acting on the lubricating liquid in the flow path 30, and improves the fluidity of the lubricating liquid. As a result, the lubricating liquid can easily flow. As a result, the lubricating liquid is supplied to the first bearing 14 and the second bearing 15 arranged on both end sides in the axial direction of the counter shaft 92 through the inside of the counter shaft 92, and can lubricate and cool each bearing.

Furthermore, in relation to the resonance frequency of the dynamic damper 20, the resonance frequency in the damper front-rear mode is higher than the resonance frequency in the damper inclination mode. As a result, the resonance frequency of the dynamic damper 20 can be adjusted to the frequencies in both the falling resonance mode and the axial resonance mode, and both the falling resonance and the axial resonance of the counter driven gear 91 can be damped.

Furthermore, the dynamic damper 20 arranged inside (in the shaft center portion of) the counter shaft 92 damps vibration before the vibration is transmitted from the first bearing 14 and the second bearing 15 to the case 12, so that vibration transmission is inhibited, and radiation sound from the case 12 can be reduced.

Furthermore, the dynamic damper 20 can be made small and lightweight with a simple structure. As a result, vibration and noise can be inhibited at low cost. Moreover, a soundproof cover of the case 12 can be simplified, and the size and cost of the entire unit can be reduced.

Note that, although an example in which the rubber 22 is joined to the mass body 21 and the rubber 22 is joined to the holder 23 has been described in the above-described first embodiment, the present disclosure is not limited thereto.

Furthermore, an annular groove extending in the circumferential direction and formed over the entire circumferential area may be provided on the bottom surface 211a of the mass body 21. The annular groove is a structure for securing clearance space for rubber compression at the time when the rubber 22 is assembled to the mass body 21, and a plurality of annular grooves may be provided at positions separated in the axial direction.

Furthermore, the mass body 21 is not limited to the structure having the recess 211 recessed radially inward from the columnar non-contact portion 212, and may have a structure having a protrusion protruding radially outward from the columnar non-contact portion 212 instead of the recess. That is, the above-described uneven structure may be the mass body 21 and the rubber 22 having a shape of reverse relation. In the case, the mass body 21 includes the protrusion instead of the recess 211, and the rubber 22 includes the recess instead of the protrusion 221.

Furthermore, the magnitude relation between the flow path cross-sectional area of the first flow path 31 and the flow path cross-sectional area of the second flow path 32 is not particularly limited. For example, the first flow path 31 is formed to have a smaller flow path cross-sectional area than the second flow path 32.

Figure 10:
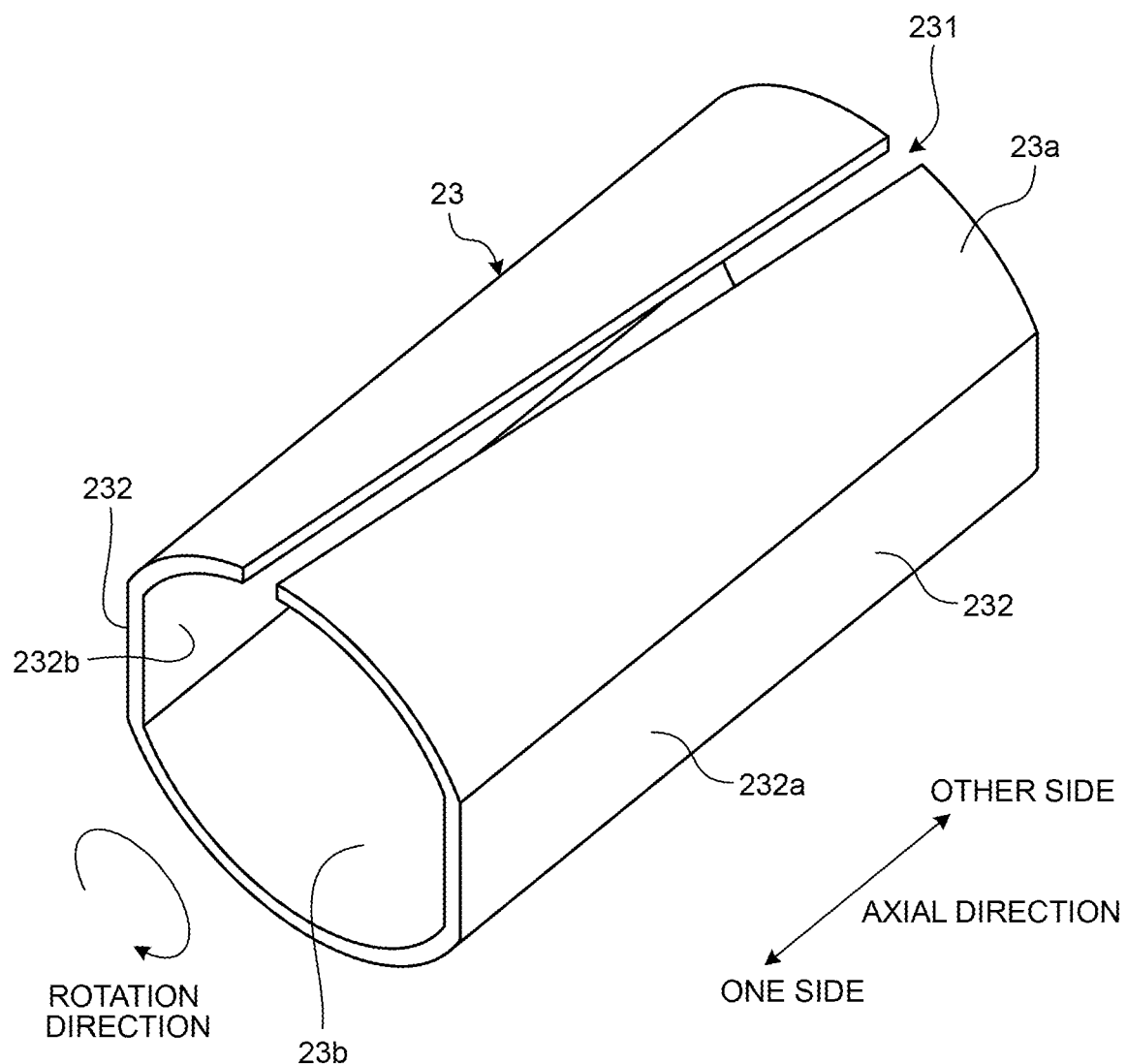
FIG. 10 is a perspective view illustrating a variation of a holder.
Figure 11:
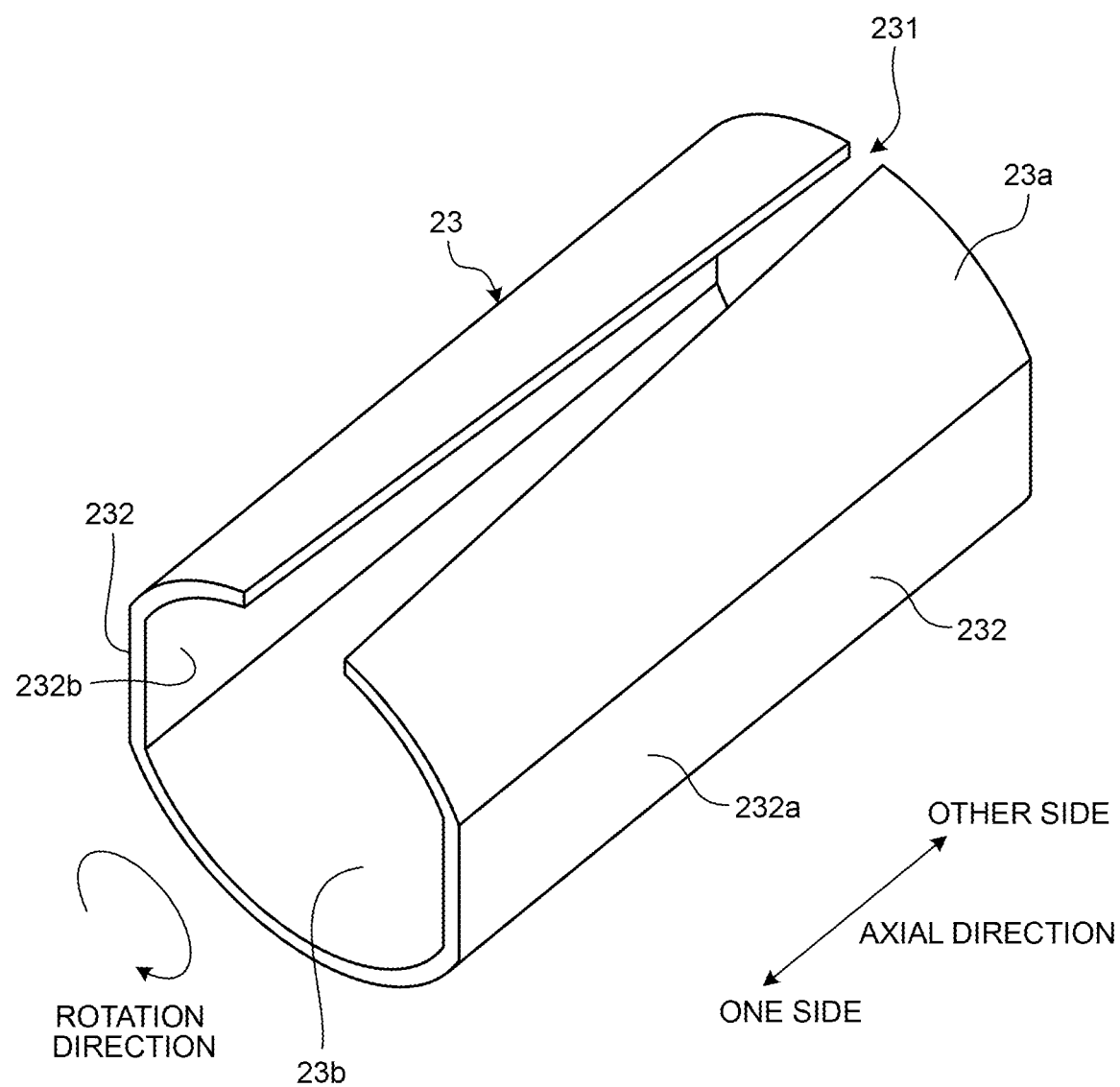
FIG. 11 is a perspective view illustrating another variation of the holder.

Furthermore, the shape of the slit portion 231 is not limited to the shape thereof in the above-described first embodiment. For example, the slit portion 231 may extend obliquely to the axial direction as illustrated in FIG. 10. Alternatively, the slit width of the slit portion 231 may gradually change as illustrated in FIG. 11. In the case, the slit portion 231 is formed such that an opening on an inflow side is wide and the opening on an outflow side is narrow, that is, the slit width is gradually narrowed from an upstream side to a downstream side. As a result, the lubricating liquid easily flows through the slit portion 231, and the fluidity of the lubricating liquid is improved.

Figure 12:
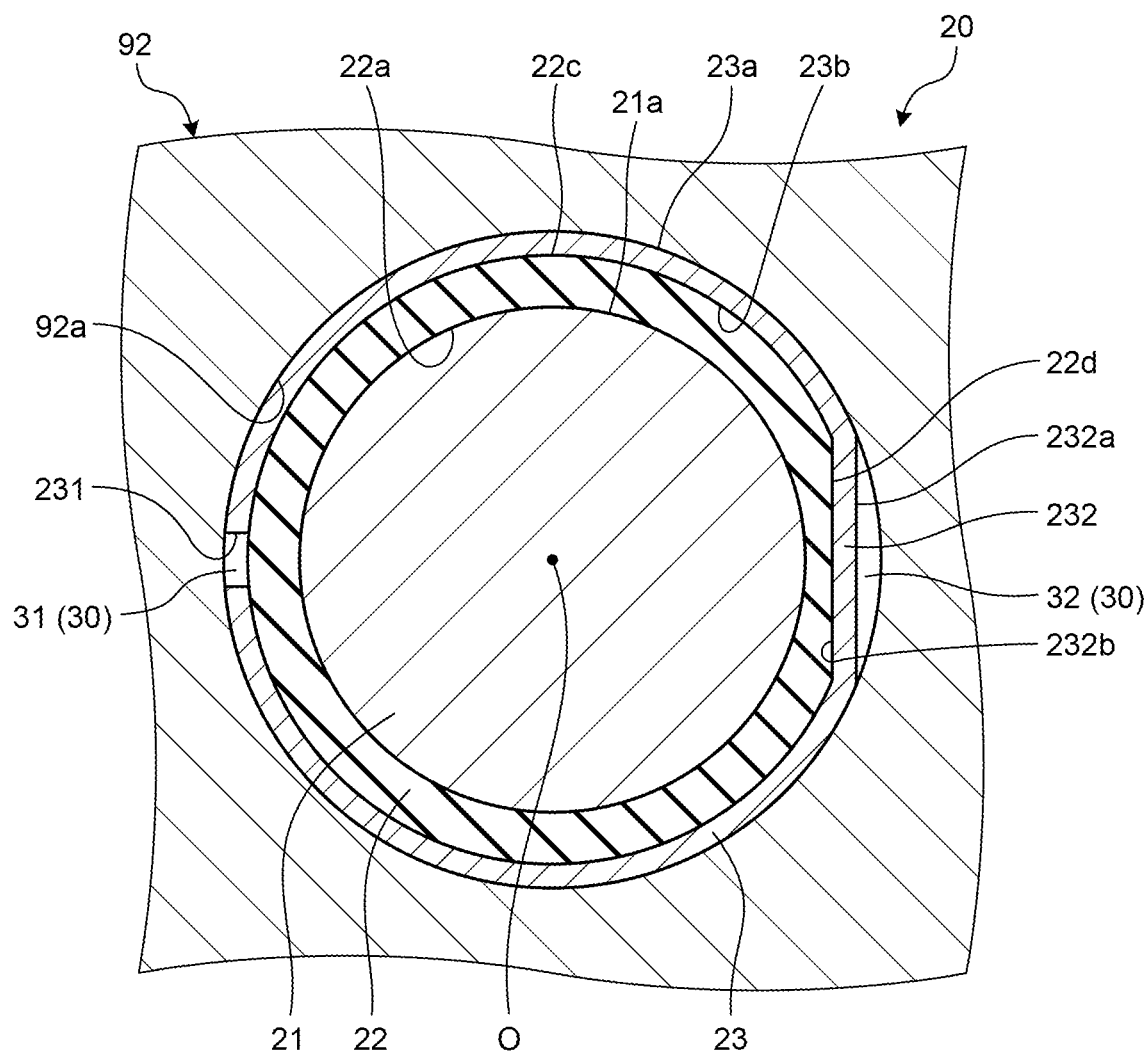
FIG. 12 is a cross-sectional view illustrating a dynamic damper according to a variation of the first embodiment.

Furthermore, in a variation of the first embodiment, as illustrated in FIG. 12, the first flow path 31 and the second flow path 32 may be provided at symmetrical positions with respect to the shaft center O. The variation has a structure in which one first flow path 31 and one second flow path 32 are provided. That is, the holder 23 of the variation includes the flat portion 232 provided at a position of 180 degrees in the circumferential direction from the slit portion 231. For that reason, the first flow path 31 and the second flow path 32 are formed at positions symmetrical with respect to the shaft center O.

Second Embodiment

In contrast to the first embodiment, in a second embodiment, a slit portion is also provided in the rubber 22 in addition to the holder 23. Note that, in the description of the second embodiment, the description of the configuration similar to that of the first embodiment or the variations thereof will be omitted, and reference signs thereof will be cited.

Figure 13:
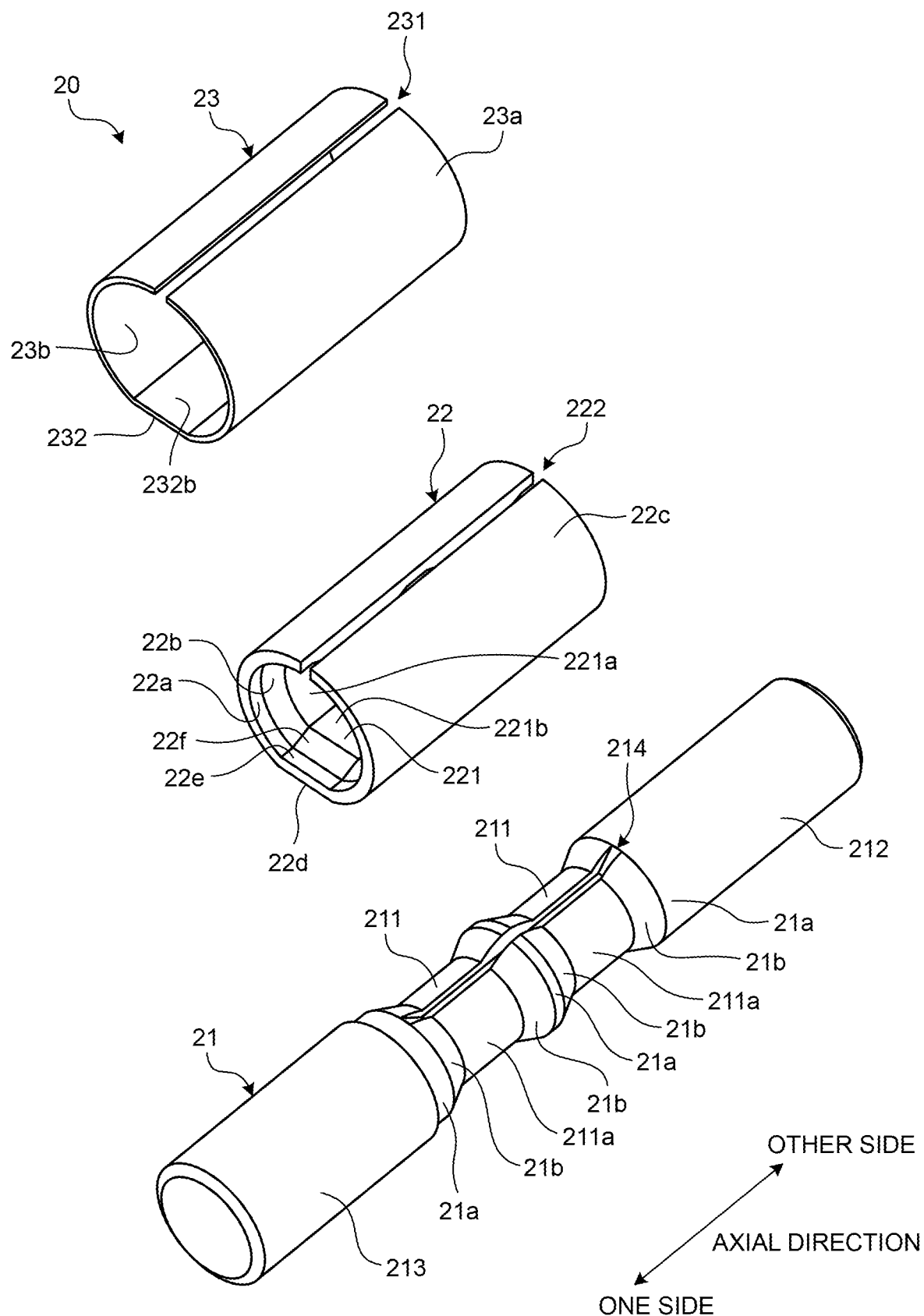
FIG. 13 is an exploded view for illustrating a dynamic damper according to a second embodiment.

As illustrated in FIG. 13, a dynamic damper 20 of the second embodiment includes a holder 23, a rubber 22, and a mass body 21. The slit portion 231 is provided in the holder 23. A slit portion 222 is provided in the rubber 22. A groove 214 is provided in the mass body 21.

The rubber 22 extends along the axial direction, and includes the slit portion 222 provided over the entire axial area of the rubber 22. The slit portion 222 is formed to have a constant width. Furthermore, one slit portion 222 is provided in a portion of the rubber 22, where both the outer peripheral surface and the inner peripheral surface are formed in an arc surface. For that reason, when the rubber 22 is viewed from the axial direction, the rubber 22 is formed in a substantially C shape. Moreover, as illustrated in FIG. 14, the slit portion 222 is provided at a position corresponding to the slit portion 231 of the holder 23.

The mass body 21 includes the groove 214 formed in the recess 211. The groove 214 has a shape recessed radially inward from the recess 211, and extends along the axial direction. The groove 214 is formed to have a constant groove width. Moreover, the groove 214 is formed to have a predetermined depth.

Furthermore, the groove 214 is provided in a range including the axial position at which a second contact portion 21b is provided. As illustrated in FIG. 13, the grooves 214 extend from one side to the other side in the axial direction in the order of the second contact portion 21b, a bottom surface 211a of the recess 211, the second contact portion 21b, a first contact portion 21a, the second contact portion 21b, the bottom surface 211a of the recess 211, and the second contact portion 21b.

Figure 14:
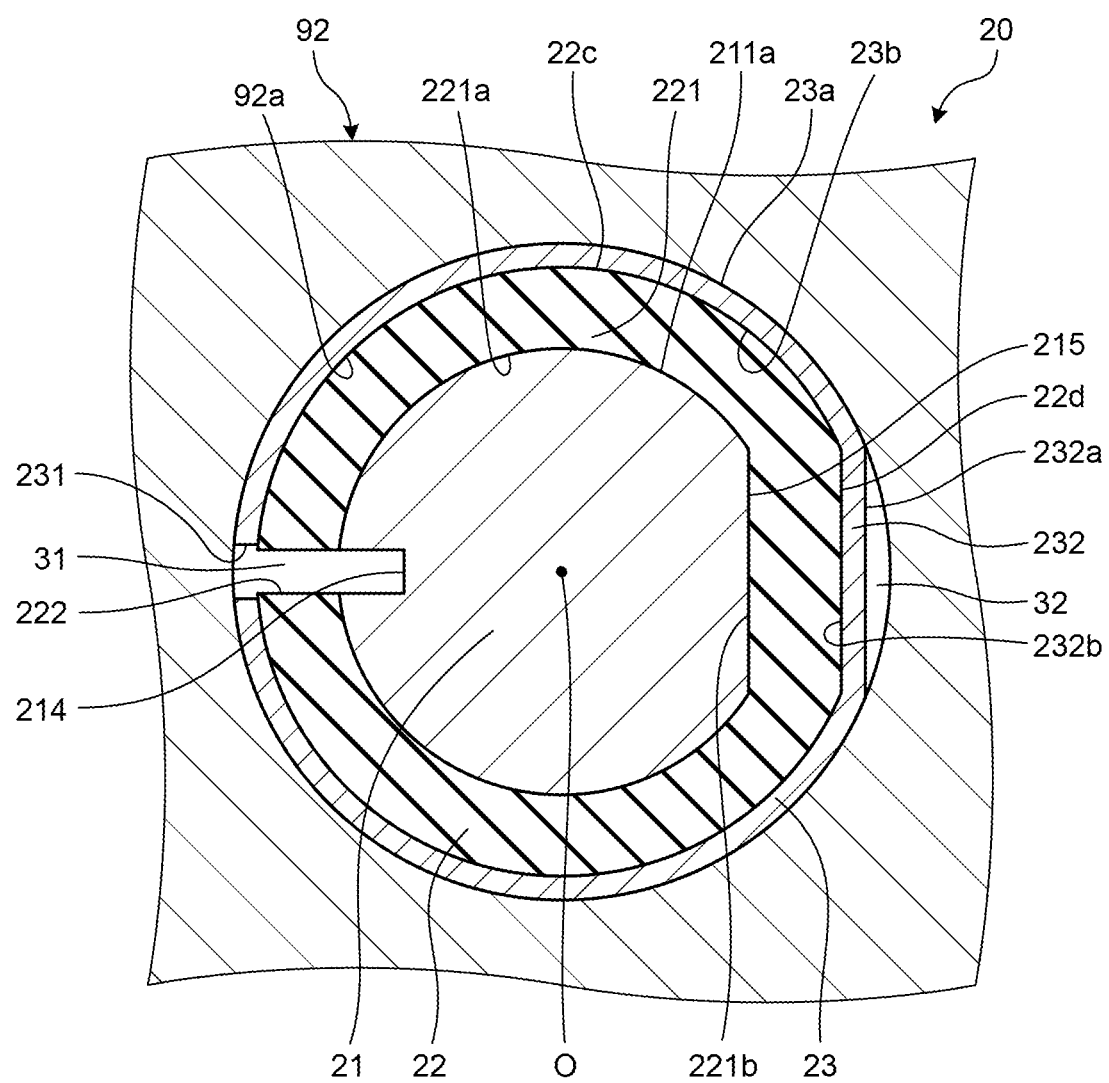
FIG. 14 is a cross-sectional view for illustrating the dynamic damper according to the second embodiment.

Moreover, as illustrated in FIG. 14, the groove 214 is provided at a position corresponding to the slit portion 231 of the holder 23. That is, the slit portion 222 and the groove 214 are parts for forming a first flow path 31 together with the slit portion 231. For that reason, the slit portion 231, the slit portion 222, and the groove 214 are arranged at the same positions in the circumferential direction. Note that, in the second embodiment, the slit portion 231 of the holder 23 is a first slit portion, and the slit portion 222 of the rubber 22 is a second slit portion.

In the second embodiment, the first flow path 31 is enlarged by the slit portion 222 and the groove 214 on the radially inner side of the slit portion 231. For that reason, the flow path cross-sectional area of the first flow path 31 can be increased. For example, the width of the slit portion 222 is narrower than the width of the slit portion 231. The groove width of the groove 214 is the same as the width of the slit portion 222.

Moreover, as illustrated in FIG. 14, a flat surface portion 215 is provided in the mass body 21 at a position opposite to the circumferential position at which the groove 214 is provided in the outer peripheral portion. That is, the flat surface portion 215 and the groove 214 are provided at positions symmetrical with respect to a shaft center O.

The flat surface portion 215 is a part for improving a mass imbalance caused by providing the groove 214 on the mass body 21. As illustrated in FIG. 14, the flat surface portion 215 is a portion where the outer peripheral surface is formed in a flat surface such that a part of the arc-shaped outer peripheral surface has a chord shape. The flat surface portion 215 is formed radially inside the bottom surface 211a. For that reason, the outer diameter of the mass body 21 is smaller than a circumferential range over which the outer peripheral surface is formed by the bottom surface 211a in an arc-shaped in the circumferential range over which the flat surface portion 215 is provided, so that the mass is reduced by that amount.

Furthermore, the flat surface portion 215 is provided in the same range as the range in which the groove 214 is provided in the axial direction. For that reason, the flat surface portions 215 extend from one side to the other side in the axial direction in the order of the second contact portion 21b, a bottom surface 211a of the recess 211, the second contact portion 21b, a first contact portion 21a, the second contact portion 21b, the bottom surface 211a of the recess 211, and the second contact portion 21b.

The holder 23 includes one slit portion 231 and one flat portion 232. The flat portion 232 is provided at a position symmetrical to the position of the slit portion 231 in the circumferential direction. In other words, as illustrated in FIG. 14, the flat portion 232 is provided at a position symmetrical to the slit portion 231 with respect to the shaft center O. Then, the slit portion 231 is a part forming the first flow path 31, and the outer peripheral surface 232a of the flat portion 232 is a part forming the second flow path 32. As described above, in the second embodiment, the first flow path 31 and the second flow path 32 are provided at symmetrical positions with respect to the shaft center O.

Furthermore, the flat portion 232 of the holder 23 is provided at a position corresponding to the circumferential position at which the flat surface portion 215 of the mass body 21 is provided. For that reason, as illustrated in FIG. 14, the flat surface portion 215 of the mass body 21 is arranged radially inside the flat portion 232 of the holder 23. Moreover, the inner peripheral surface 232b of the flat portion 232 is in contact with the flat second outer peripheral surface 22d of the outer peripheral surface of the rubber 22.

The rubber 22 is configured to have a uniform thickness at the same axial position. For that reason, in the portion where the outer peripheral surface is formed by the second outer peripheral surface 22d, the inner peripheral surface thereof is formed by an inner peripheral surface flat to the circumferential direction. As illustrated in FIG. 14, in the portion where the protrusion 221 of the rubber 22 and the recess 211 of the mass body 21 are in contact with each other, a flat inner peripheral surface 221b of the protrusion 221 is in contact with the flat surface portion 215 of the mass body 21 as an inner peripheral surface corresponding to the second outer peripheral surface 22d. Furthermore, in the rubber 22, the portion formed by the second outer peripheral surface 22d and the flat inner peripheral surface 221b has the same thickness as the portion formed by the first outer peripheral surface 22c and the arc-shaped inner peripheral surface 221a.

Furthermore, the rubber 22 includes a flat inner peripheral surface 22e at a circumferential position corresponding to the second outer peripheral surface 22d at an axial position at which the first contact surface 22a is an inner peripheral surface. Similarly, the rubber 22 includes a flat inner peripheral surface 22f at a circumferential position corresponding to the second outer peripheral surface 22d at an axial position at which the second contact surface 22b is an inner peripheral surface.

As described above, according to the second embodiment, providing the flat surface portion 215 on the mass body 21 can improve the imbalance of the mass at the time of rotation of the dynamic damper 20.

Furthermore, in the dynamic damper 20, the rubber 22 is formed to have a uniform thickness at parts at the same axial position, so that spring constants in directions (elastic modulus in compression direction) are the same as each other in a direction orthogonal to the axial direction (radial direction). As a result, the resonance frequencies in the directions in the radial direction are constant.

Furthermore, the dynamic damper 20 includes the flat surface portion 215, the flat portion 232, and the second outer peripheral surface 22d, so that the dynamic damper 20 has a cross-sectional shape orthogonal to the axial direction, which is not a perfect circle. This prevents the circumferential position of each part (groove 214, slit portion 231, and slit portion 222) for forming the first flow path 31 from deviating.

Furthermore, the rubber 22 includes the slit portion 222, so that the slit portion 222 is also provided at the axial position where the second contact surface 22b is formed. For that reason, the contact area between the mass body 21 and the second contact surface 22b can be reduced as compared with that in the case where the slit portion 222 is not provided. As a result, the elastic modulus in the compression direction at the time of axial vibration can be reduced as compared with that in the case where the slit portion 222 is not provided in the rubber 22. As described above, the elastic modulus in the damper front-rear mode can be adjusted by providing the slit portion 222 in an axial range where the second contact surface 22b is provided. That is, the resonance frequency in the damper front-rear mode can be adjusted by the size of the second contact surface 22b.

Note that, although the groove 214 is provided at a position corresponding to the slit portion 222 in the second embodiment, the groove 214 is not required to be provided when the elastic modulus in the compression direction at the time of axial vibration is adjusted. This is because the area of the second contact surface 22b can be adjusted by the slit portion 222, and the portion of the mass body 21 corresponding to the slit portion 222 cannot even be in contact with the rubber 22. As described above, when the elastic modulus in the compression direction at the time of axial vibration is adjusted, the area of the second contact surface 22b is reduced by providing the slit portion 222 in order to adjust the contact area between the second contact surface 22b and the mass body 21. Thus, the contact area between the second contact surface 22b and the mass body 21 is reduced regardless of the presence or absence of the groove 214. For that reason, the dynamic damper 20 may have a structure in which the slit portion 231 and the slit portion 222 are provided but the groove 214 is not provided in the mass body 21. Moreover, when the groove 214 is not provided, mass imbalance does not occur at the time of rotation of the mass body 21, so that the flat surface portion 215 is not provided on the mass body 21. That is, in the case, the dynamic damper 20 obtained by providing the slit portion 222 of the second embodiment in the rubber 22 of the first embodiment may be provided.

Furthermore, although, in each of the above-described embodiments, an example in which the holder 23 includes one member has been described, the present disclosure is not limited thereto. For example, the holder 23 may include two members. One example of such a variation is illustrated in FIGS. 15 and 16.

Figure 15:
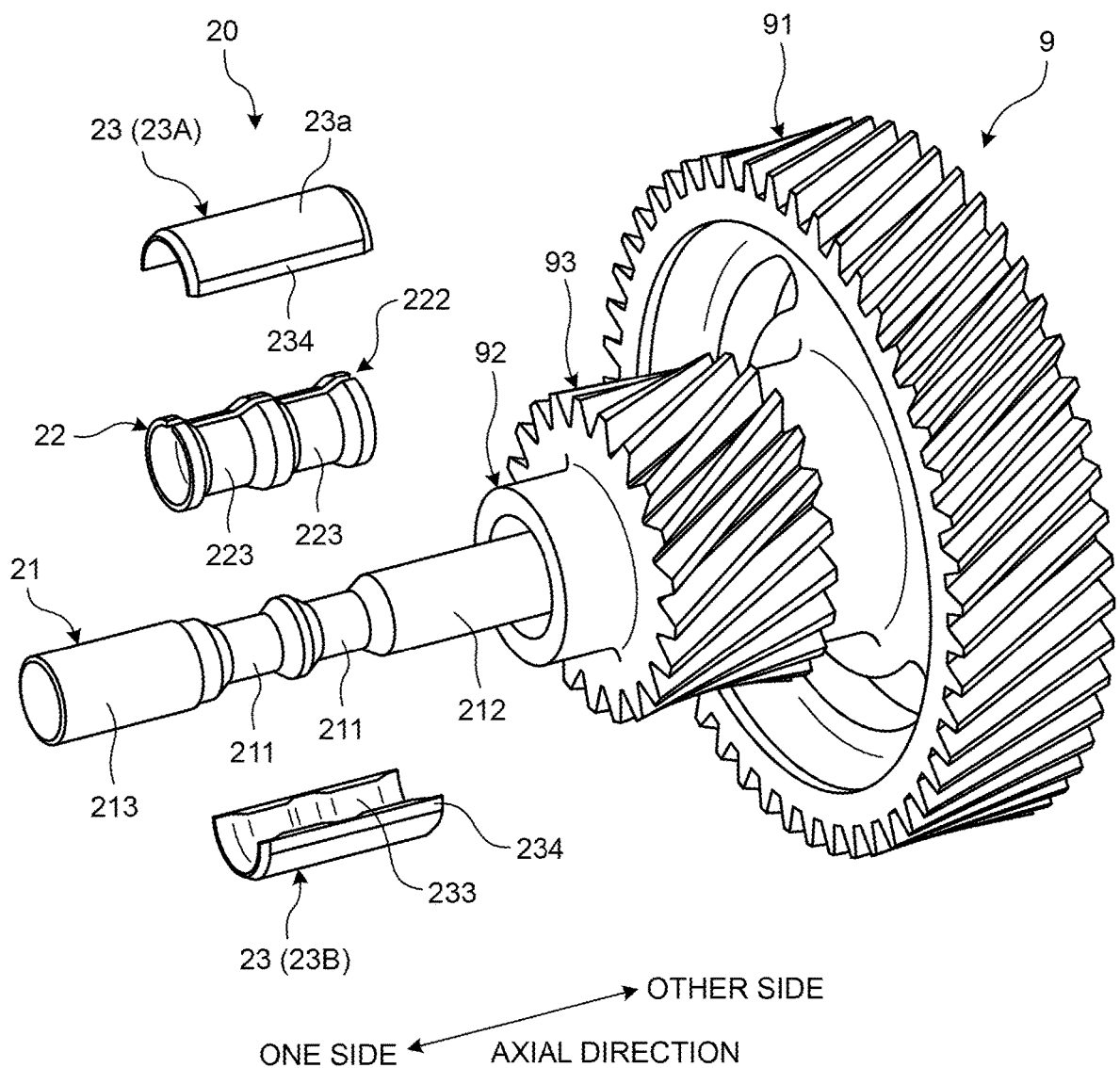
FIG. 15 is an exploded view for illustrating a dynamic damper according to a variation.

As illustrated in FIG. 15, the holder 23 of a variation includes a pair of members 23A and 23B having a shape in which a tubular member is halved. The pair of members 23A and 23B is integrated so as to cover the outer peripheral portion of the rubber 22 from the state before assembly illustrated in FIG. 15.

Figure 16:
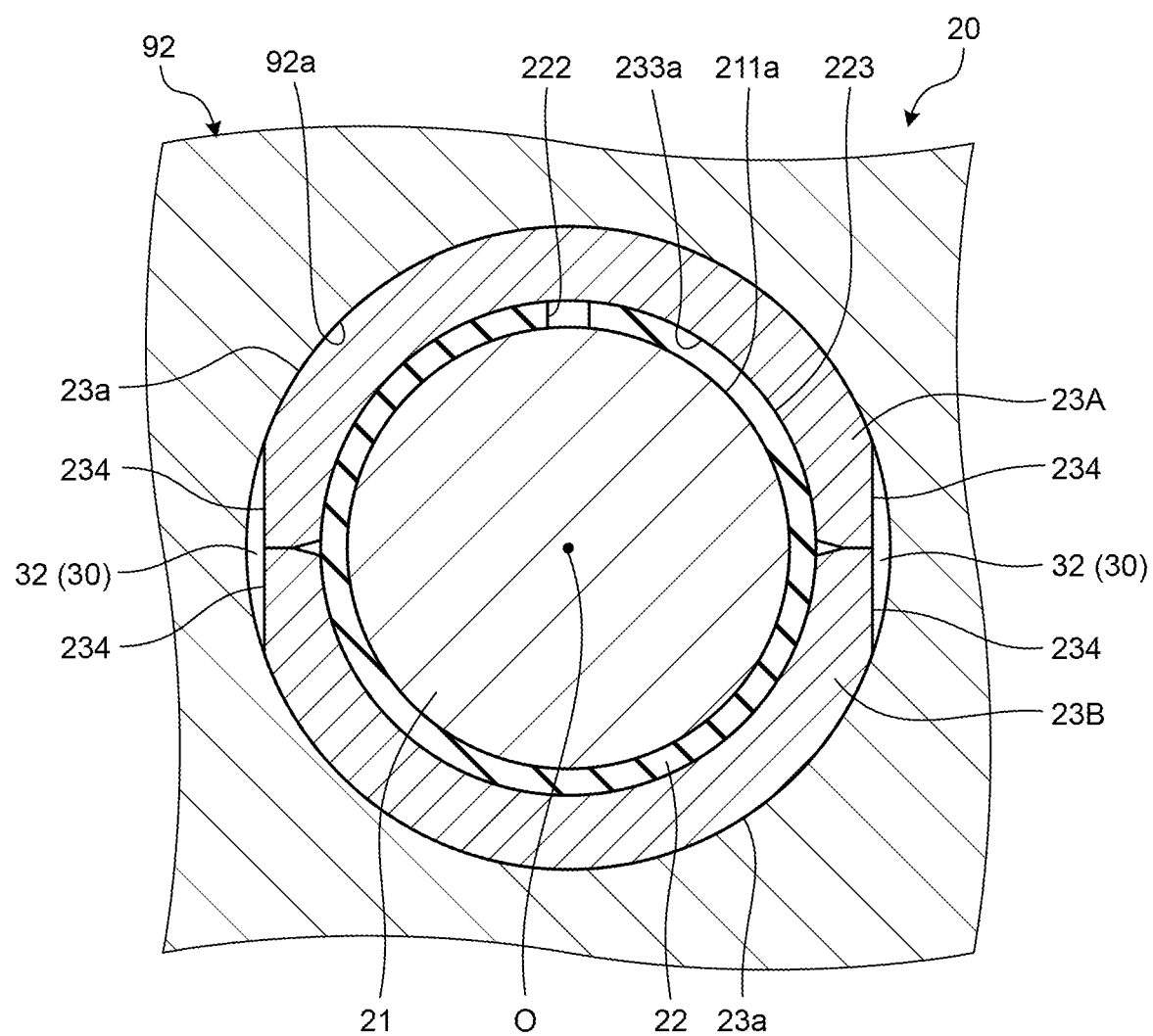
FIG. 16 is a cross-sectional view for illustrating the dynamic damper according to the variation.

Furthermore, as illustrated in FIG. 16, the holder 23 includes a flat portion 234 that is flat in the circumferential direction as a portion forming the second flow path 32. The flat portion 234 is provided on both circumferential sides at a halved circumferential position in each of the members 23A and 23B. For that reason, the second flow path 32 is surrounded by the flat portion 234 provided in one member 23A, the flat portion 234 provided in the other member 23B, and the inner peripheral surface 92a of the counter shaft 92. Then, two second flow paths 32 are provided at symmetrical positions in the circumferential direction.

Moreover, in the variation, the rubber 22 includes the slit portion 222 and a recess 223. The recess 223 is in contact with the recess 211 of the mass body 21. The inner peripheral surface of the recess 223 is in contact with the bottom surface 211a of the recess 211. Since the rubber 22 is formed to have a uniform thickness as a whole, the outer peripheral surface of the recess 223 is formed to have a shape along the inner peripheral surface of the recess 223. For that reason, the holder 23 includes a protrusion 233 protruding radially inward as a portion in contact with the recess 223 of the rubber 22. An inner peripheral surface 233a of the protrusion 233 is in contact with the outer peripheral surface of the recess 223.

Note that, in the variation in FIGS. 15 and 16, the holder 23 does not include a slit portion at a position corresponding to the slit portion 222 of the rubber 22. For that reason, the slit portion 222 is not a portion for forming the first flow path 31. The slit portion 222 of the variation has a configuration for improving assemblability at the time when the rubber 22 is attached to the mass body 21. That is, the slit portion 222 can reduce the frictional force between the rubber 22 and the mass body 21 at the time of assembly.

Furthermore, as in the variation in FIGS. 15 and 16, the dynamic damper 20 may have a structure including only the second flow path 32 as the flow path 30. That is, the dynamic damper 20 may have at least one of the first flow path 31 and the second flow path 32. For that reason, as a variation of the first embodiment, the dynamic damper 20 may have a structure without the second flow path 32.

In the present disclosure, a flow path through which lubricating liquid flows is provided between the inner peripheral surface of a rotation shaft and a mass body. Since the flow path is formed by the inner peripheral surface of the rotation shaft, the lubricating liquid flows along the inner peripheral surface of the rotation shaft by centrifugal force, and flows through the inside of the flow path. As a result, the lubricating liquid can easily flow inside the rotation shaft on which a dynamic damper is disposed. Furthermore, as compared with a case where the flow path is formed by the inner peripheral surface of the mass body, the centrifugal force acting on the lubricating liquid increases, so that the fluidity of the lubricating liquid is improved.

According to an embodiment, a flow path for lubricating liquid to flow is provided between the inner peripheral surface of the rotation shaft and the mass body. Since the flow path is formed by the inner peripheral surface of the rotation shaft, the lubricating liquid flows along the inner peripheral surface of the rotation shaft by centrifugal force, and flows through the inside of the flow path. As a result, the lubricating liquid can easily flow inside the rotation shaft on which a dynamic damper is disposed. Furthermore, as compared with a case where the flow path is formed by the inner peripheral surface of the mass body, the centrifugal force acting on the lubricating liquid increases, so that the fluidity of the lubricating liquid is improved.

According to an embodiment, compressive stress acts on an elastic body both when a gear vibrates so as to fall from the radial direction of the rotation shaft to the axial direction side and when the gear vibrates along the axial direction of the rotation shaft. Furthermore, the elastic modulus in a compression direction at the time of axial vibration can be increased by a second contact surface as compared with that in the case where the contact surface between the elastic body and the mass body includes only a surface parallel to the axial direction of the rotation shaft. As a result, damping effect can be exerted to both of vibration due to gear falling and axial vibration of the gear.

According to an embodiment, since a slit portion is provided at an axial position where the second contact surface is formed in the elastic body, the contact area between the mass body and the second contact surface can be reduced as compared with that in the case where the slit portion is not provided. As a result, the elastic modulus in the compression direction at the time of axial vibration can be reduced as compared with that in the case where the slit portion is not provided in the elastic body.

According to an embodiment, a holder can integrally hold the mass body and the elastic body. Moreover, the assemblability at the time when the mass body and the elastic body are assembled to the holder is improved.

According to an embodiment, a first flow path along the inner peripheral surface of a rotation shaft can be formed while the flow path cross-sectional area of the first flow path can be secured by a first slit portion.

According to an embodiment, the second flow path along the inner peripheral surface of the rotation shaft can be formed while the flow path cross-sectional area of the second flow path can be secured by the gap between a second outer peripheral surface and the inner peripheral surface of the rotation shaft.

According to an embodiment, the first flow path and the second flow path formed along the inner peripheral surface of the rotation shaft increases the flow path cross-sectional area, and the flow rate of the lubricating liquid flowing through the flow path increases.

According to an embodiment, the first flow path formed by a groove can increase the flow path cross-sectional area of the first flow path. Furthermore, the groove and a flat surface portion are arranged at symmetrical positions with respect to the shaft center of the rotation shaft on the outer peripheral portion of the mass body, which improves the imbalance of mass at the time of rotation.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A dynamic damper for suppressing vibration generated by a gear attached to a rotation shaft, the dynamic damper comprising:
    a mass body that is disposed inside the rotation shaft having a hollow shape and extends along a shaft center of the rotation shaft; and
    an elastic body configured to couple the mass body to a holder of the rotation shaft,
    wherein a flow path for lubricating liquid to flow is provided between an inner peripheral surface of the rotation shaft and the mass body,
    the flow path is formed by the inner peripheral surface of the rotation shaft at an axial position where the elastic body is disposed, and
    wherein the mass body is vibratable to a linear motion state in which the mass body reciprocates along the shaft center of the rotation shaft,
    the elastic body includes:
    a first contact surface that is in contact with the mass body and parallel to an axial direction of the rotation shaft; and
    a second contact surface that is in contact with the mass body at a position different from the first contact surface and not parallel to the axial direction of the rotation shaft,
    when the gear generates vibration so as to fall from a radial direction of the rotation shaft to an axial direction side of the rotation shaft, compressive stress acts on the elastic body by the mass body vibrating so as to push the first contact surface in response to the vibration, and
    when the gear generates vibration along the axial direction of the rotation shaft, compressive stress acts on the elastic body by the mass body coming in the linear motion state in response to the vibration and vibrating so as to push the second contact surface, and
    wherein the elastic body includes a slit portion formed over an entire axial area, and the flow path includes a first flow path formed by the inner peripheral surface of the rotation shaft and the slit portion.

2. A dynamic damper for suppressing vibration generated by a gear attached to a rotation shaft, the dynamic damper comprising:
   a mass body that is disposed inside the rotation shaft having a hollow shape and extends along a shaft center of the rotation shaft; and
   an elastic body configured to couple the mass body to a holder of the rotation shaft,
   wherein a flow path for lubricating liquid to flow is provided between an inner peripheral surface of the rotation shaft and the mass body,
   the flow path is formed by the inner peripheral surface of the rotation shaft at an axial position where the elastic body is disposed, and
   wherein the mass body is vibratable to a linear motion state in which the mass body reciprocates along the shaft center of the rotation shaft,
   the elastic body includes:
   a first contact surface that is in contact with the mass body and parallel to an axial direction of the rotation shaft; and
   a second contact surface that is in contact with the mass body at a position different from the first contact surface and not parallel to the axial direction of the rotation shaft,
   when the gear generates vibration so as to fall from a radial direction of the rotation shaft to an axial direction side of the rotation shaft, compressive stress acts on the elastic body by the mass body vibrating so as to push the first contact surface in response to the vibration, and
   when the gear generates vibration along the axial direction of the rotation shaft, compressive stress acts on the elastic body by the mass body coming in the linear motion state in response to the vibration and vibrating so as to push the second contact surface, and
   wherein the holder having a tubular shape, which is attached to the inner peripheral surface of the rotation shaft and integrally holds the mass body and the elastic body,
   wherein the flow path is formed by the inner peripheral surface of the rotation shaft and the holder,
   wherein the holder includes a first slit portion formed over an entire axial area, and
   the flow path includes a first flow path formed by the inner peripheral surface of the rotation shaft and the first slit portion.

3. The dynamic damper according to claim 2,
   wherein the holder includes:
   a first outer peripheral surface in contact with the inner peripheral surface of the rotation shaft; and
   a second outer peripheral surface that is provided at a circumferential position different from the first slit portion and not in contact with the inner peripheral surface of the rotation shaft,
   the flow path includes a second flow path formed by the inner peripheral surface of the rotation shaft and the second outer peripheral surface,
   the elastic body includes a second slit portion provided at a position corresponding to the first slit portion and formed over the entire axial area, and
   the first flow path is formed by the inner peripheral surface of the rotation shaft, the first slit portion, and the second slit portion.

4. The dynamic damper according to claim 3,
   wherein the mass body includes:
   a groove that is provided at a position corresponding to the first slit portion and the second slit portion in an outer peripheral portion and extends along the axial direction; and
   a flat surface portion provided at a position symmetrical to the groove with respect to the shaft center of the rotation shaft in the outer peripheral portion,
   the first flow path is formed by the inner peripheral surface of the rotation shaft, the first slit portion, the second slit portion, and the groove, and
   the second flow path is provided at a position symmetrical to the first flow path with respect to the shaft center of the rotation shaft.

5. A dynamic damper for suppressing vibration generated by a gear attached to a rotation shaft, the dynamic damper comprising:
   a mass body that is disposed inside the rotation shaft having a hollow shape and extends along a shaft center of the rotation shaft; and
   an elastic body configured to couple the mass body to a holder of the rotation shaft,
   wherein a flow path for lubricating liquid to flow is provided between an inner peripheral surface of the rotation shaft and the mass body,
   the flow path is formed by the inner peripheral surface of the rotation shaft at an axial position where the elastic body is disposed, and
   wherein the mass body is vibratable to a linear motion state in which the mass body reciprocates along the shaft center of the rotation shaft,
   the elastic body includes:
   a first contact surface that is in contact with the mass body and parallel to an axial direction of the rotation shaft; and
   a second contact surface that is in contact with the mass body at a position different from the first contact surface and not parallel to the axial direction of the rotation shaft,
   when the gear generates vibration so as to fall from a radial direction of the rotation shaft to an axial direction side of the rotation shaft, compressive stress acts on the elastic body by the mass body vibrating so as to push the first contact surface in response to the vibration, and
   when the gear generates vibration along the axial direction of the rotation shaft, compressive stress acts on the elastic body by the mass body coming in the linear motion state in response to the vibration and vibrating so as to push the second contact surface, and
   wherein the holder having a tubular shape, which is attached to the inner peripheral surface of the rotation shaft and integrally holds the mass body and the elastic body,
   wherein the flow path is formed by the inner peripheral surface of the rotation shaft and the holder,
   wherein the holder includes a first slit portion formed over an entire axial area,
   the flow path includes a first flow path formed by the inner peripheral surface of the rotation shaft and the first slit portion,
   wherein the holder includes: a first outer peripheral surface in contact with the inner peripheral surface of the rotation shaft; and a second outer peripheral surface, which is not in contact with the inner peripheral surface of the rotation shaft, and the flow path includes a second flow path formed by the inner peripheral surface of the rotation shaft and the second outer peripheral surface.

\* \* \* \* \*